US012177390B2

(12) United States Patent
Hanai

(10) Patent No.: US 12,177,390 B2
(45) Date of Patent: Dec. 24, 2024

(54) SERVER SYSTEM, INFORMATION PROCESSING APPARATUS, AND METHOD FOR CONTROLLING INFORMATION PROCESSING APPARATUS

(71) Applicant: CANON KABUSHIKI KAISHA, Tokyo (JP)

(72) Inventor: Hiroaki Hanai, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/050,313

(22) Filed: Oct. 27, 2022

(65) Prior Publication Data
US 2023/0137604 A1 May 4, 2023

(30) Foreign Application Priority Data
Oct. 28, 2021 (JP) .................................. 2021-176243

(51) Int. Cl.
*G06F 15/00* (2006.01)
*H04N 1/00* (2006.01)
*H04N 1/42* (2006.01)

(52) U.S. Cl.
CPC ..... *H04N 1/00233* (2013.01); *H04N 1/00212* (2013.01); *H04N 1/00217* (2013.01); *H04N 1/00244* (2013.01); *H04N 1/00408* (2013.01); *H04N 1/00482* (2013.01); *H04N 1/42* (2013.01)

(58) Field of Classification Search
CPC .......... H04N 1/00233; H04N 1/00212; H04N 1/00217; H04N 1/00244; H04N 1/00408; H04N 1/00482; H04N 1/42
USPC ....................................................... 358/1.15
See application file for complete search history.

(56) References Cited

U.S. PATENT DOCUMENTS

| 2016/0026416 | A1* | 1/2016 | Kikuchi | G06F 3/1203 358/1.15 |
| 2020/0099642 | A1* | 3/2020 | Mishima | G06F 3/1257 |
| 2021/0055897 | A1* | 2/2021 | Tomihisa | H04L 51/10 |
| 2022/0057973 | A1* | 2/2022 | Saito | G06Q 10/087 |
| 2022/0214845 | A1* | 7/2022 | Ohashi | H04L 51/02 |

FOREIGN PATENT DOCUMENTS

JP 2021043717 A 3/2021

* cited by examiner

*Primary Examiner* — Mark R Milia
(74) *Attorney, Agent, or Firm* — Canon U.S.A., Inc. IP Division

(57) ABSTRACT

A server system that operates in collaboration with software that enables performing an operation relating to a file posted with a message includes a memory storing a program and a control unit that executes the program to provide an object corresponding to a print function to be displayed on a first operation screen for performing the operation relating to the file or on a second operation screen called from the first operation screen, and cause, based on selection of the object, the software to perform processing to enable an operation for printing the file.

10 Claims, 16 Drawing Sheets

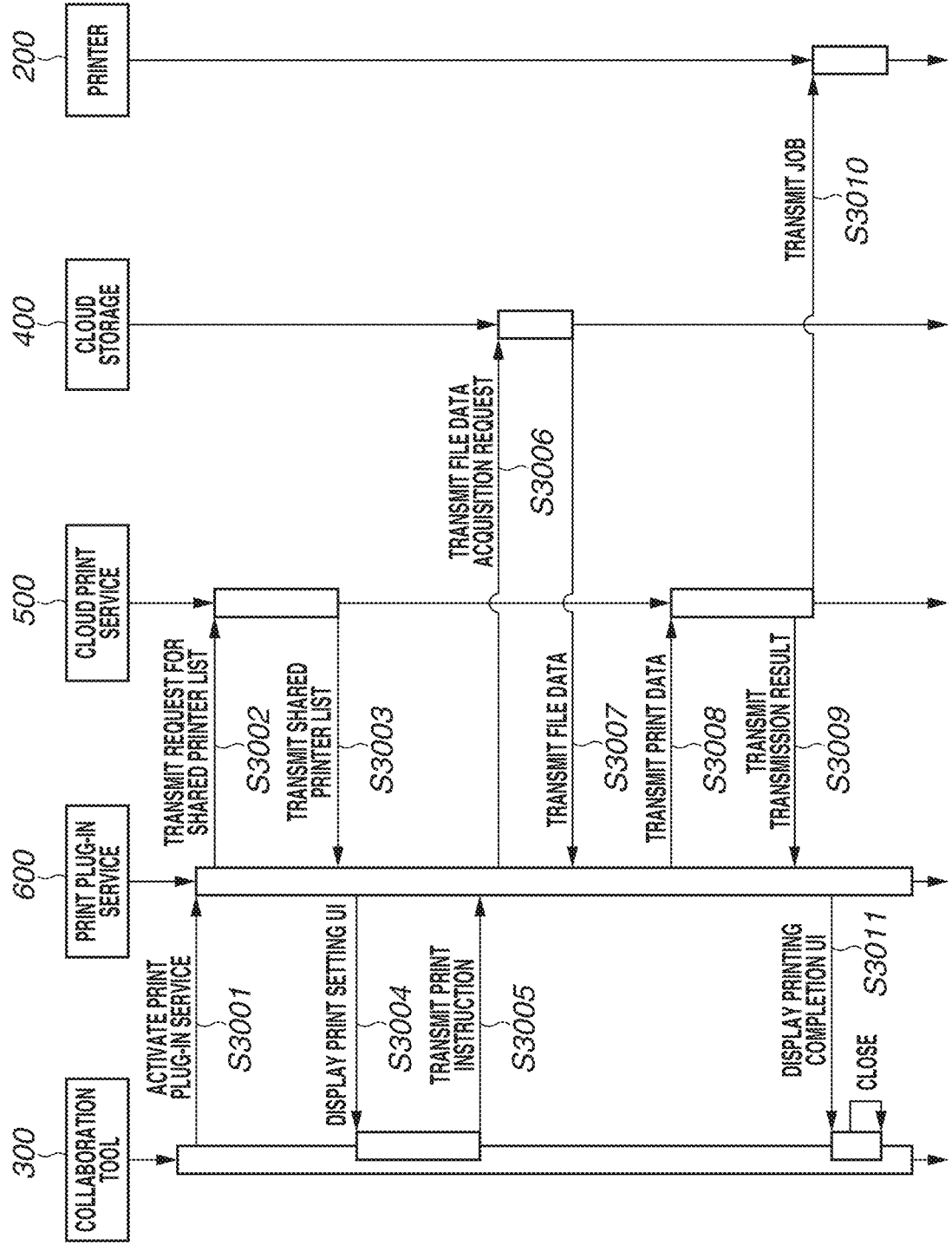

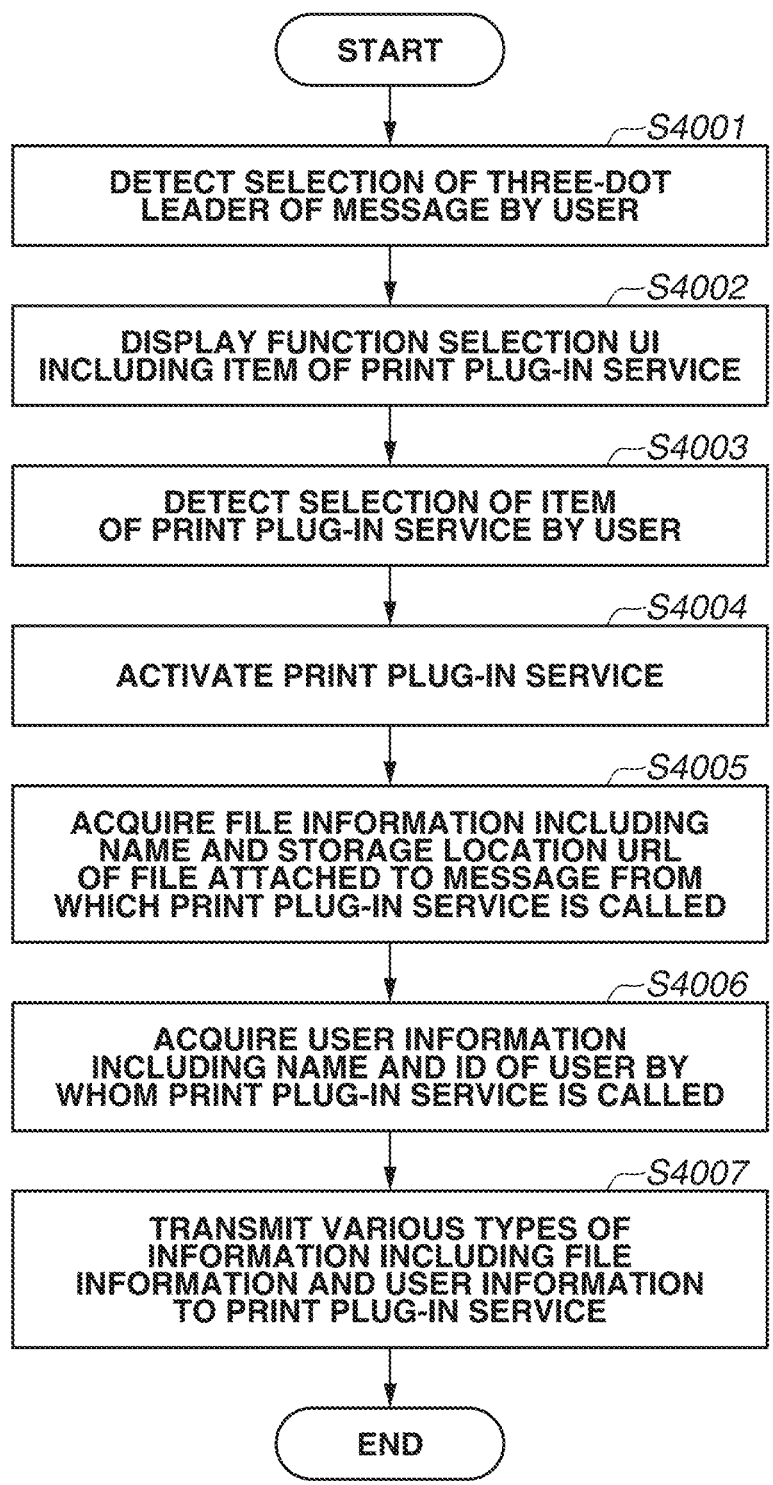

SERVER SYSTEM, INFORMATION PROCESSING APPARATUS, AND METHOD FOR CONTROLLING INFORMATION PROCESSING APPARATUS

BACKGROUND

Field

The present disclosure relates to a server system, an information processing apparatus, and a method for controlling the information processing apparatus.

Description of the Related Art

There are typical collaboration tools such as Microsoft Teams®, Skype®, and Slack®. To share a file on these collaboration tools, an owner of the file stored on a shared server or stored locally attaches the file to a message and posts the message with the attachment file to upload the file. Another user can view, edit, and/or download the uploaded file by operating a file list screen or a user interface (UI) displayed on the message.

A shared file can be printed by a plug-in including a print function (hereinafter, the plug-in will be referred to as "print plug-in") via a cloud print service. Japanese Patent Application Laid-Open No. 2021-43717 discusses a method for printing a file posted to a chat message using a chatbot server. A print bot detects, on a collaboration tool, a post of a message indicating printing from a user or a printing action such as selection of an icon on a print plug-in displayed on a collaboration tool UI. The print bot inputs a print job to a virtual queue of an image forming apparatus registered in advance in a tenant of a cloud print service and manages the print job.

The image forming apparatus acquires the print job from the virtual queue of the cloud print service and outputs the print job. Examples of typical cloud print services serving as collaboration partners of print plug-ins are Microsoft Universal Print® and uniFLOW Online®.

Japanese Patent Application Laid-Open No. 2021-43717, is not seen to discuss a method where a user can select a file to be printed from among uploaded files on the collaboration tool by operating an information processing apparatus where the collaboration tool is installed.

SUMMARY

According to an aspect of the present disclosure, a server system configured to operate in collaboration with software providing a chat function that displays, in a case where a file is posted with a message, a message card including a file name of the file and the message, displays, outside the message card, a first object to be selected in performing an operation relating to the message, and displays, in an area of the message card, a second object to be selected in performing an operation relating to the file, includes a memory storing a program, and a control unit, the control unit configured to execute the program to provide an object corresponding to a print function to be displayed on a first operation screen for performing the operation relating to the file or on a second operation screen called from the first operation screen, the first operation screen being displayed based on selection of the second object, and cause, based on selection of the object, the software to perform processing to enable an operation for printing the file using the server system.

Further features of the present disclosure will become apparent from the following description of exemplary embodiments with reference to the attached drawings.

BRIEF DESCRIPTION OF THE DRAWINGS

FIG. 6 is a diagram illustrating an example of a printing sequence according to an exemplary embodiment.

FIG. 7 is a flowchart illustrating a process in activating a print plug-in by a collaboration tool according to a first exemplary embodiment.

DESCRIPTION OF THE EMBODIMENTS

Exemplary embodiments of the present disclosure will be described below with reference to the drawings.

Figure 1:
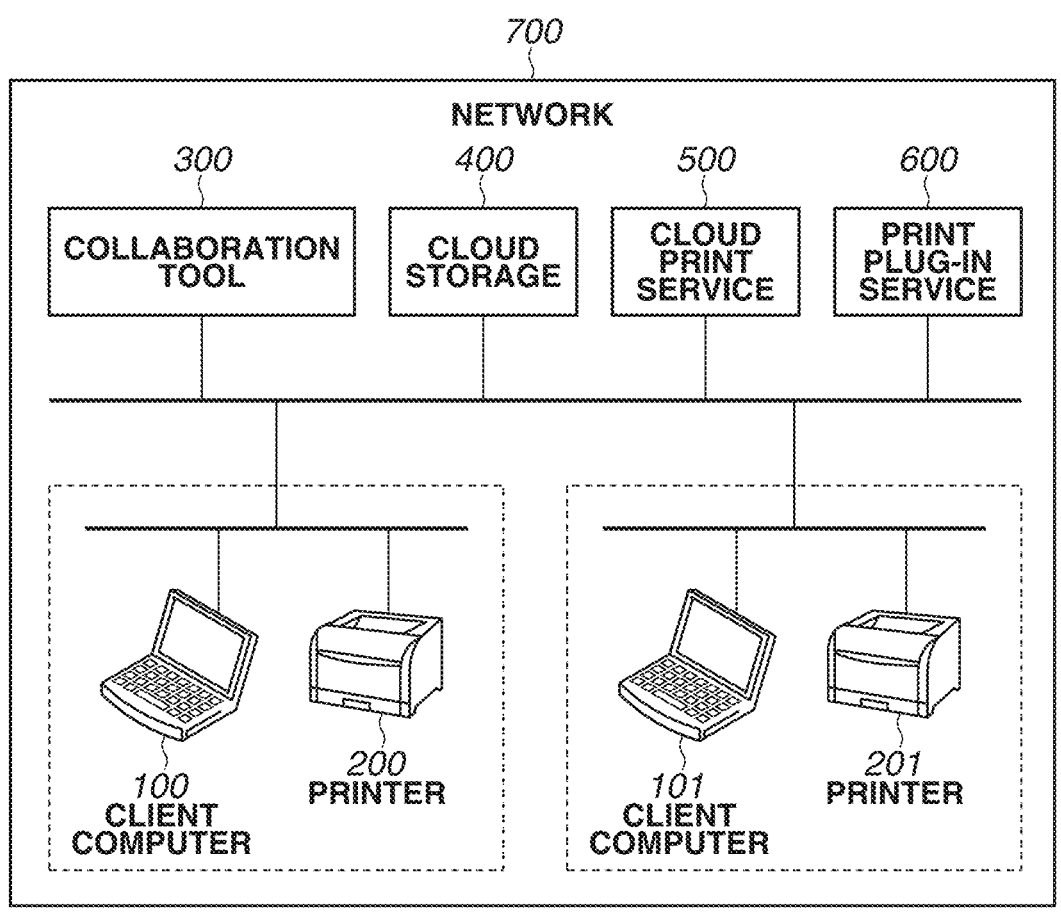
FIG. 1 is a diagram illustrating an example of a system configuration according to an exemplary embodiment.

FIG. 1 is a diagram illustrating a system configuration of a network 700 according to a first exemplary embodiment. A client computer 100 and a printer 200 are connected to the network 700, are configured using the same intranet, and can communicate with each other.

A client computer 101 and a printer 201 are connected to another intranet and are connected via the Internet. The client computers 100 and 101 can be smartphones or tablet terminals as well as personal computers (PCs). A collaboration tool 300, a cloud storage 400, a cloud print service 500, and a print plug-in service 600 are connected to the network 700.

The collaboration tool 300 is a server system that provides a service that runs on an application running on both the client computers 100 and 101 or runs on a web browser installed on both the client computers 100 and 101. The collaboration tool 300 provides an online meeting service and a chat service to the client computers 100 and 101. Each account is managed using a user identification (ID) and a password, and a user can use a service provided by the collaboration tool 300 using the managed account. Online meetings can be held via video calls and chats, and a user without a registered account can temporarily use the service by invitation.

The cloud storage 400 is a cloud that is a server system including a single server apparatus or a plurality of server apparatuses. The cloud storage 400 provides a storage service on the Internet. A user authenticated successfully based on an ID and a password for the cloud storage 400 can use the service. The user using the cloud storage 400 can upload file data to the cloud storage 400 and can view and download file data stored in the cloud storage 400. The file data uploaded to the cloud storage 400 can be shared with other users, and settings to restrict viewing, editing, and downloading can be set for each user or group.

The cloud print service 500 is a cloud that is a server system including a single server apparatus or a plurality of server apparatuses. The cloud print service 500 provides a print function to a user via the Internet. In the present exemplary embodiment, the cloud print service 500 is connectable to each intranet. The cloud print service 500 is connectable to the client computer 100 and the printer 200 and to the client computer 101 and the printer 201 via the Internet. The cloud print service 500 manages each account using an ID and a password for the cloud print service 500, and a user can use the print function provided by the cloud print service 500 using the managed account.

The print plug-in service 600 is a server system including a single information processing apparatus or a plurality of information processing apparatuses. The print plug-in service 600 provides a print function online in collaboration with the cloud storage 400, the cloud print service 500, and the collaboration tool 300. A user that logged into the service provided by the collaboration tool 300 can use the function provided by the print plug-in service 600 by performing an operation for using a service provided by the print plug-in service 600 on the collaboration tool 300. In a case where the user operates a user interface (UI) provided to the collaboration tool 300 by the print plug-in service 600, a processing command is transmitted to the print plug-in service 600. The print plug-in service 600 that received the command performs print processing via the cloud print service 500. The print plug-in service 600 acquires message information from the collaboration tool 300 and file information from the cloud storage 400.

In accessing the collaboration tool 300, the cloud storage 400, and the cloud print service 500, a single sign-on scheme can be used to access the services using the account for the collaboration tool 300.

Next, hardware configurations of systems according to the present exemplary embodiment will be described below with reference to FIGS. 2A, 2B, 2C, 2D, 2E, and 2F.

Figure 2A:
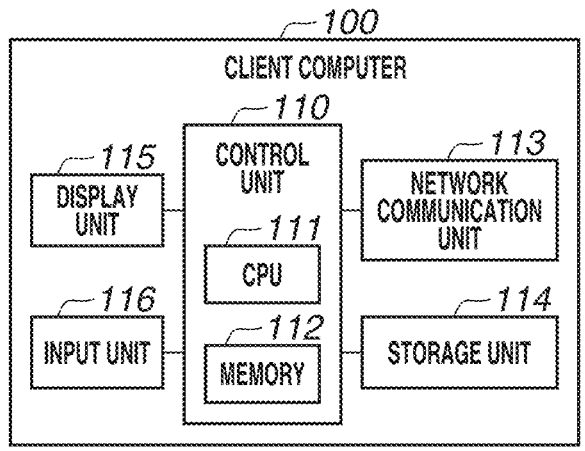
FIGS. 2A, 2B, 2C, 2D, 2E, and 2F are diagrams illustrating an example of a hardware configuration according to an exemplary embodiment.

FIG. 2A is a block diagram illustrating a hardware configuration of the client computer 100.

The client computer 100 includes a control unit 110, a network communication unit 113, a storage unit 114, a display unit 115, and an input unit 116. The control unit 110 includes a central processing unit (CPU) 111 and a memory 112 and controls operations of the client computer 100. The CPU 111 loads a program stored in the storage unit 114 to the memory 112 and executes the loaded program. The memory 112 is a main storage memory of the CPU 111 and is used as a work area and a temporary storage area for loading various programs. The network communication unit 113 is a device that communicates with an external server and an external information communication terminal via the external network 700 and that inputs and outputs digital data. The storage unit 114 is a non-volatile storage device such as a hard disk or a solid state drive (SSD) and can store and rewrite digital data. The display unit 115 is a device such as a liquid crystal display that displays visual information to a user in real time. The input unit 116 is a device for receiving user input, such as a keyboard, a mouse, a camera, or a microphone. A device that includes both input and display functions, such as a touch panel, can be used.

In the present exemplary embodiment, an application for using the service provided by the collaboration tool 300 is installed in the storage unit 114 of the client computer 100. The application stored in the storage unit 114 is loaded to the memory 112, and the loaded application is executed by the CPU 111, whereby the client computer 100 accesses the service provided by the collaboration tool 300 and provides online meeting and chat functions to a user. The client computer 101 has a hardware configuration similar to that of the client computer 100, and thus, a detailed description is omitted herein.

Figure 2B:
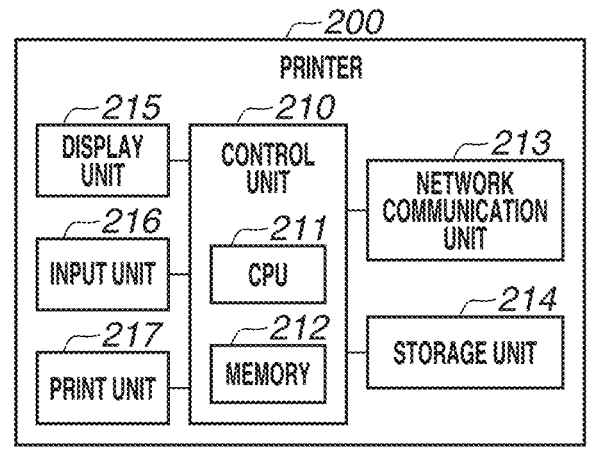

FIG. 2B is a block diagram illustrating a hardware configuration of the printer 200. The printer 200 includes a control unit 210, a network communication unit 213, a storage unit 214, a display unit 215, an input unit 216, and a print unit 217. The control unit 210, the CPU 211, the memory 212, and the storage unit 214 are similar to their corresponding units in FIG. 2A, so their descriptions are omitted herein. The network communication unit 213 is a device that communicates with the external network 700 and mainly receives print data and transmits a state, such as an error, of the printer 200 to an external device. In a case where the printer 200 is a printer that supports cloud printing, the network communication unit 213 communicates with the cloud print service 500 and transmits registration information and receives print jobs. The display unit 215 is a device for displaying information to a user in real time, such as a light emitting diode (LED) or a touch panel attached to the printer 200. The input unit 216 is a device for receiving user input and can include a touch panel and a hardware key such as a numeric keypad. The print unit 217 is a device that performs print processing on a sheet stored in a cassette or on a tray by performing a series of operations including feeding the sheet, printing, and discharging the sheet. Any printing method, such as an electrophotographic method or an inkjet method, is applicable. The print unit 217 includes a two-sided printing unit and a finishing device for use in sheet discharging. In the present exemplary embodiment, a multi-function printer (MFP) including both scanner and facsimile functions can be used. The printer 201 has a configuration similar to that of the printer 200, and thus, a detailed description is omitted herein.

Figure 2C:
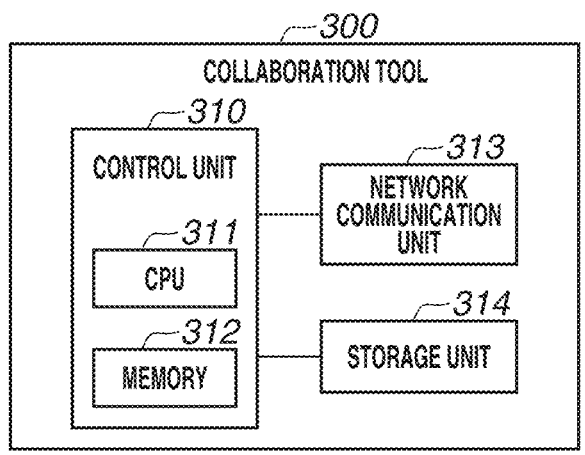

FIG. 2C is a block diagram illustrating a hardware configuration of the collaboration tool 300. The collaboration tool 300 includes a control unit 310, a network communication unit 313, and a storage unit 314. These units have the same configuration to their corresponding units in FIG. 2A, as such, their detailed descriptions are omitted herein. The storage unit 314 stores a program for providing the online meeting and chat services by the collaboration tool 300. The program is loaded into a memory 312, and a CPU 311 executes the loaded program, whereby the collaboration tool 300 provides the services to the client computers 100 and 101.

Figure 2D:
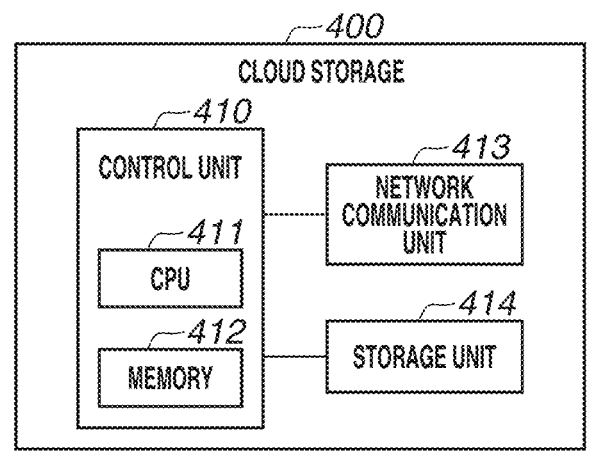

FIG. 2D is a block diagram illustrating a hardware configuration of the cloud storage 400.

The cloud storage 400 includes a control unit 410, a CPU 411, a memory 412, a network communication unit 413, and a storage unit 414. These units have the same configuration to their corresponding units in FIG. 2A, as such, their detailed descriptions are omitted herein. The storage unit 414 stores a program used for providing the storage service by the cloud storage 400 and file data uploaded by users.

Figure 2E:
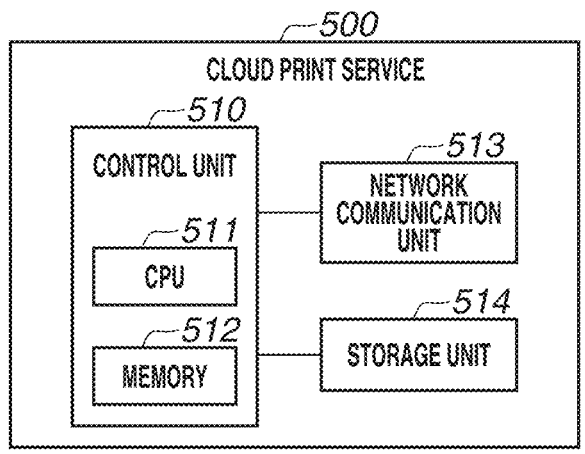

FIG. 2E is a block diagram illustrating a hardware configuration of the cloud print service 500. The cloud print service 500 includes a control unit 510, a CPU 511, a memory 512, a network communication unit 513, and a storage unit 514. These units have the same configuration to their corresponding units in FIG. 2A, as such, their detailed descriptions are omitted herein. The storage unit 514 stores a program for providing the service by the cloud print service 500, print data received from the client computers 100 and 101, and file information acquired from the cloud storage 400. The storage unit 514 stores printer names and Internet Protocol (IP) addresses of the printers 200 and 201, which are transmission destinations of print data from the cloud print service 500, and information about users that can use the printers 200 and 201.

Figure 2F:
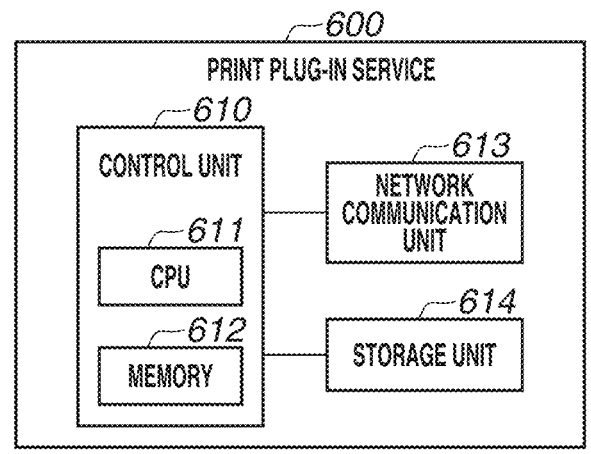

FIG. 2F is a block diagram illustrating a hardware configuration of the print plug- in service 600. The print plug-in service 600 includes a control unit 610, a CPU 611, a memory 612, a network communication unit 613, and a storage unit 614. These units have the same configuration to their corresponding units in FIG. 2A, as such, their detailed descriptions are omitted. The storage unit 614 stores a program for providing the service by the print plug-in service 600.

An information processing apparatus having a hardware configuration including the collaboration tool 300, the cloud storage 400, the cloud print service 500, or the print plug-in service 600 can be a plurality of information processing apparatuses. Details of the present exemplary embodiment will be described below.

Registration of Print Plug-in Service

First, operations that a user needs to perform in order to use functions provided by the print plug-in service 600 from the application provided by the collaboration tool 300 will be described below.

The collaboration tool 300 provides a conversion function via a video call or a chat as a standard function. The collaboration tool 300 provides an extension function to a user by collaborating with a server system provided by a vendor different from a vendor that provides the collaboration tool 300. In the present exemplary embodiment, the print function is provided as an extension function. A vendor that provides the print function registers in advance identification information for identifying the print plug-in service 600 and a manifest file in the collaboration tool 300. The manifest file describes a uniform resource locator (URL) for calling a print plug-in provided by the print plug-in service 600 by the collaboration tool 300. A user can use the registered extension function by installing the application for providing the registered extension function in the service provided by the collaboration tool 300.

As illustrated in FIGS. 3A, 3B, 3C, and 3D, the system can provide an extension function through collaboration with the cloud storage 400 or installation of another application, and a UI is prepared for each function.

Figure 3A:
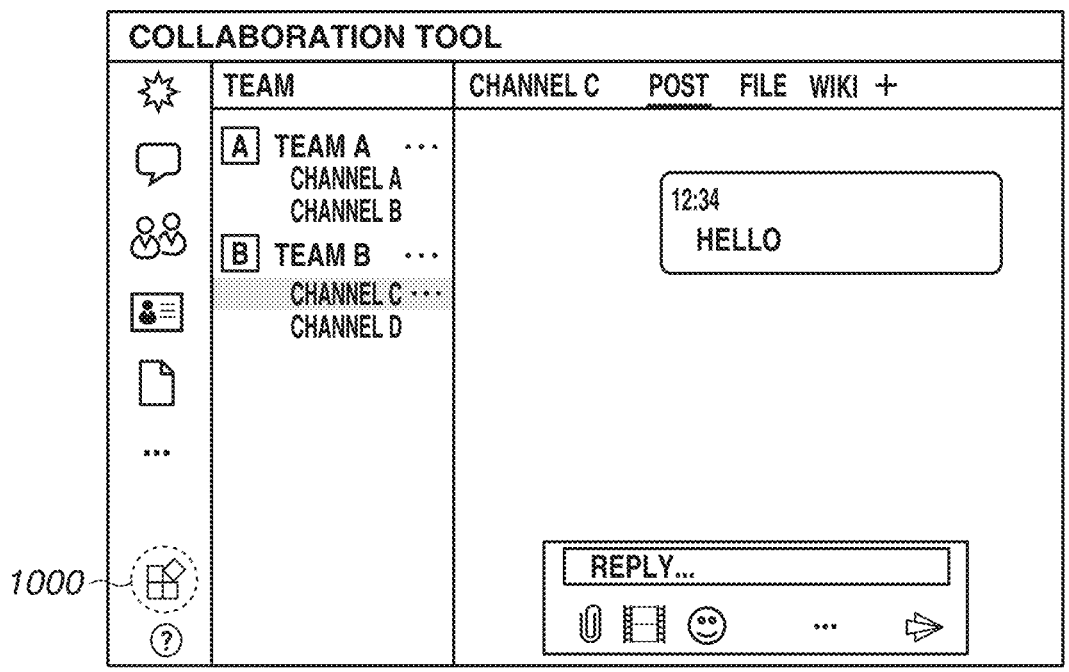
FIGS. 3A, 3B, 3C, and 3D are diagrams illustrating an example of an application installation user interface (application installation UI) according to an exemplary embodiment.
Figure 3B:
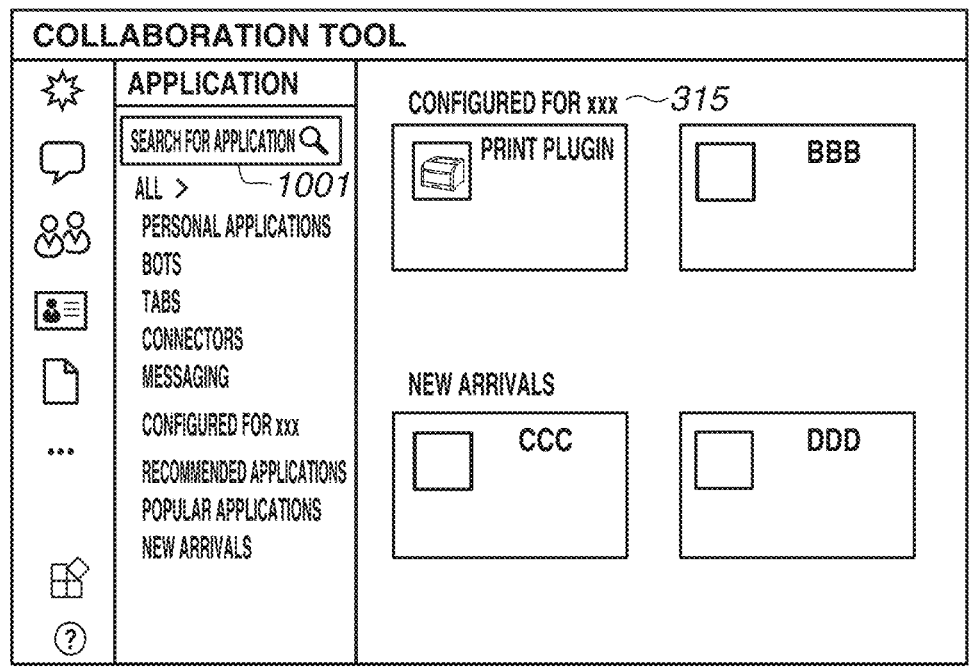
Figure 4:
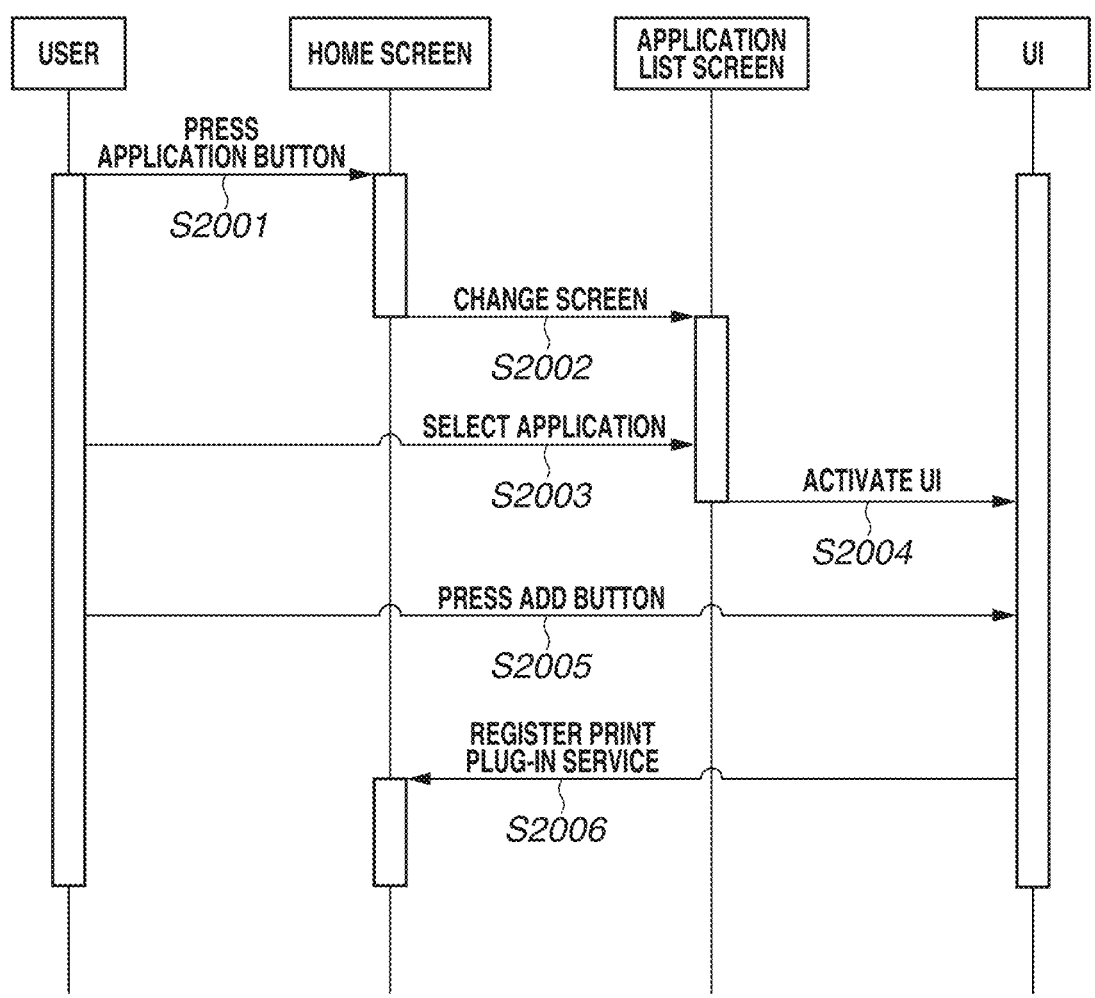
FIG. 4 is a diagram illustrating an example of a procedure of registering a print plug-in according to an exemplary embodiment.

FIG. 3A illustrates an example of a collaboration tool screen. Installed function buttons are pinned and displayed on an application bar on the collaboration tool 300, and an application can be selected from an application button 1000 and installed for each individual person or team. A case where the print plug-in service 600 is registered corresponding to an individual person will be described as an example below with reference to a procedure illustrated in FIG. 4.

In step S2001, the collaboration tool 300 detects the selection of the application button 1000 by a user. In step S2002, the collaboration tool 300 displays a registerable application list screen (FIG. 3B) on the display unit 115 of the client computer 100.

On a UI 1001, a category of applications can be selected, and a list of applications filtered based on a user selection result is displayed on a screen 315. In step S2003, the collaboration tool 300 detects the selection of the print plug-in service 600 by the user. Then, in step S2004, the collaboration tool 300 displays a pop-up UI illustrated in FIG. 3C on the display unit 115 of the client computer 100.

In step S2005, the collaboration tool 300 detects the selection of an ADD button 316. In step S2006, the collaboration tool 300 registers the print plug-in service 600. The registering of the print plug-in service 600 herein refers to an operation of registering identification information about the user having issued the registration instruction and identification information about the print plug-in service 600 in the storage unit 314 of the collaboration tool 300.

Figure 3C:
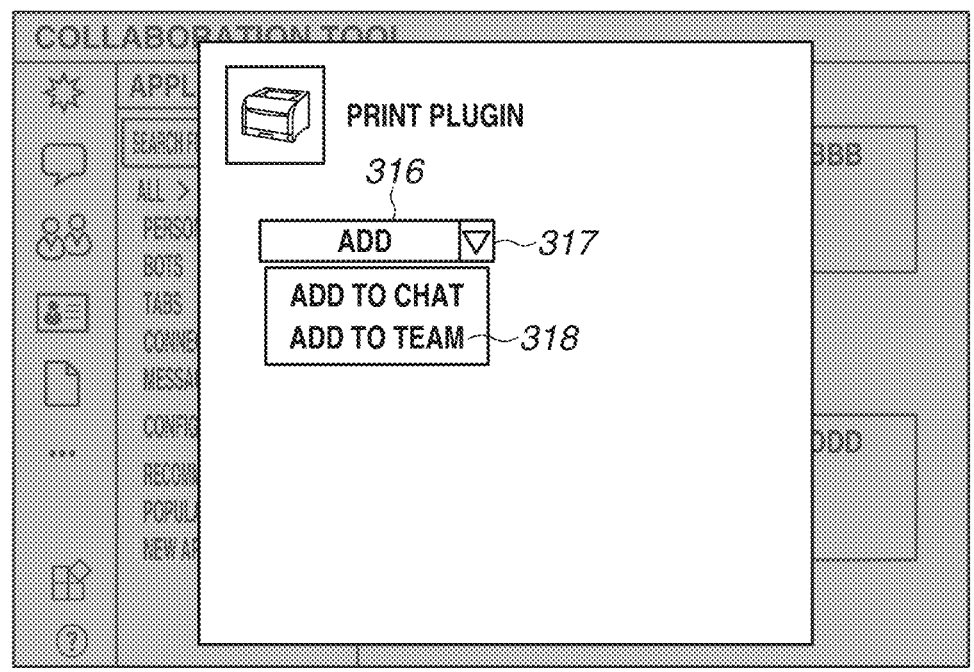
Figure 3D:
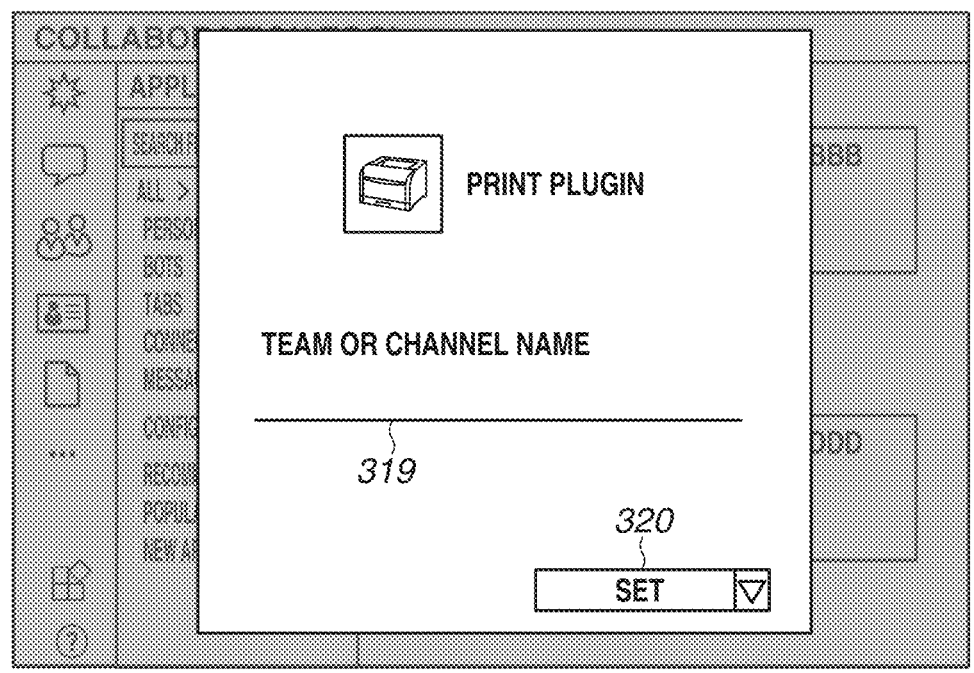

In a case where the print plug-in service 600 is to be registered to a team, the user selects an ADD TO TEAM 318 from a list 317 on the screen illustrated in FIG. 3C. In a case where the collaboration tool 300 detects the selection of the ADD TO TEAM 318, the collaboration tool 300 displays a pop-up illustrated in FIG. 3D on the screen of the client computer 100. The user inputs identification information about the team that is a registration destination or a channel name in an entry field 319 and selects a SET button 320. The collaboration tool 300 refers to the input identification information about the team or the input channel name and registers the print plug-in service 600. The registering herein refers to the storing of the identification information about the team or the channel in association with the identification information about the print plug-in service 600 in a storage of the collaboration tool 300. This enables calling the print plug-in service 600 from a screen of the team or the channel associated with the print plug-in service 600.

The print plug-in service 600 can be registerable from various areas on the collaboration tool 300, such as a team management button, a tab, or a message posting UI. For example, besides a method of registering the print plug-in service 600 for each user, the print plug-in service 600 can be registered by an administrator center of the collaboration tool 300 registering an application, making a registration setting, and designating a user or a team.

The screen illustrated in FIG. 3C includes an object for receiving an instruction to register the print plug-in service 600 for a chat. The object is an object for enabling use of the print plug-in service 600 in a chat room designated by a user. In a case where the user selects an "ADD TO CHAT", a screen for selecting a chat room to enable the use of the print plug-in service 600 is displayed. In a case where the user selects a chat room, the collaboration tool 300 stores identification information about the chat room in association with the identification information about the print plug-in service 600 and enables the use of services of the print plug-in service 600 from the chat room.

After the registration of the print plug-in service 600 is completed, an icon for activating the print plug-in service 600 is displayed in a three-dot leader or the like of the collaboration tool 300. The user can use a service provided by the print plug-in service 600 by clicking the displayed icon of the print plug-in service 600.

Collaboration of Print Plug-In and Services

Collaborations between the print plug-in service 600 and various cloud services will be described below. In a case where a user is authenticated on the collaboration tool 300, a token is issued, and the print plug-in service 600 can collaborate with a cloud service using the token and can transmit and receive information to and from the cloud service.

A file stored in the storage unit 414 of the cloud storage 400 includes information about sharing settings and access rights as well as basic information such as a file name and a creator. A control permission with respect to a file or a folder can be set for each user or each team, and a permission to read a file, a permission to write a file, a permission to download a file, and a permission to print a file can be set. The foregoing information can be changed directly from a web page of the cloud storage 400 and can be changed using a web application programming interface (web API). File information, access rights information, and sharing settings information can be acquired via the web API.

Pre-registered user information and pre-registered printer information are stored in the cloud print service 500. Besides printer name data, printer identification (printer ID) data, registrant data, and state data, job acceptance capability information and operation status information are also registered and managed. The registered information can be checked and changed by accessing a web page of the cloud print service 500, and part of the information can be acquired using the web API. A print job including file data and advanced settings is transmitted to a virtual printer queue registered in the cloud print service 500, and an instruction to start printing is issued, using the web API.

A case where the print plug-in service 600 is called from the three-dot leader of a message with an attachment file to perform printing will be described below.

First, changes of a print setting UI displayed in a case where the print plug-in service 600 is called on the collaboration tool 300 will be described below with reference to FIGS. 5A, 5B, 5C, and 5D.

Figure 5A:
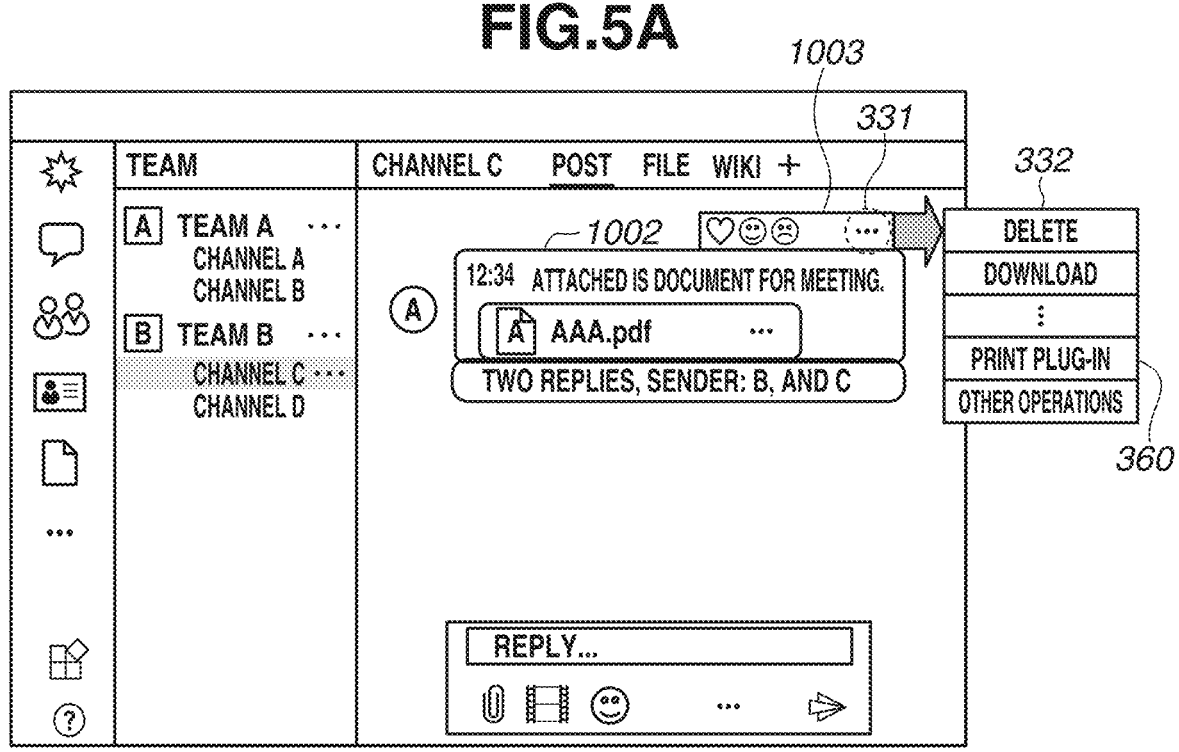
FIGS. 5A, 5B, 5C, and 5D are diagrams illustrating an example of a print setting user interface (print setting UI) provided by a print plug-in according to an exemplary embodiment.

In a case where a message with an attachment file is posted, the collaboration tool 300 displays a message card 1002 as illustrated in FIG. 5A. The message card 1002 displays the posted message and a file name together with a posting time. A username is added to the message card 1002 to specify a user having posted the message.

A toolbar 1003 is displayed outside the message card 1002. The toolbar 1003 is an area for posting a reaction to the message card 1002. The toolbar 1003 displays a three-dot leader 331 as well as objects for posting a reaction. The three-dot leader 331 is an object for displaying a function selection user interface (function selection UI) 332 for issuing an instruction for the message card 1002. The function selection UI 332 is an operation screen for calling a function provided by the collaboration tool 300 and an application installed additionally by the user.

In a case where the print plug-in service 600 is registered, the function selection UI 332 displays standard functions provided by the collaboration tool 300 and a "PRINT PLUG-IN" 360. For example, a "DELETE" of the function selection UI 332 is an object for deleting the message card 1002.

In a case where a user selects the "PRINT PLUG-IN" 360, the print plug-in service 600 communicates with the collaboration tool 300, the cloud storage 400, and the cloud print service 500 and acquires file information to be printed and print queue information for use in printing. The print plug-in service 600 transmits an instruction to display a screen illustrated in FIG. 5B to the collaboration tool 300 based on the information acquired from the collaboration tool 300 and the cloud print service 500.

Figure 5B:
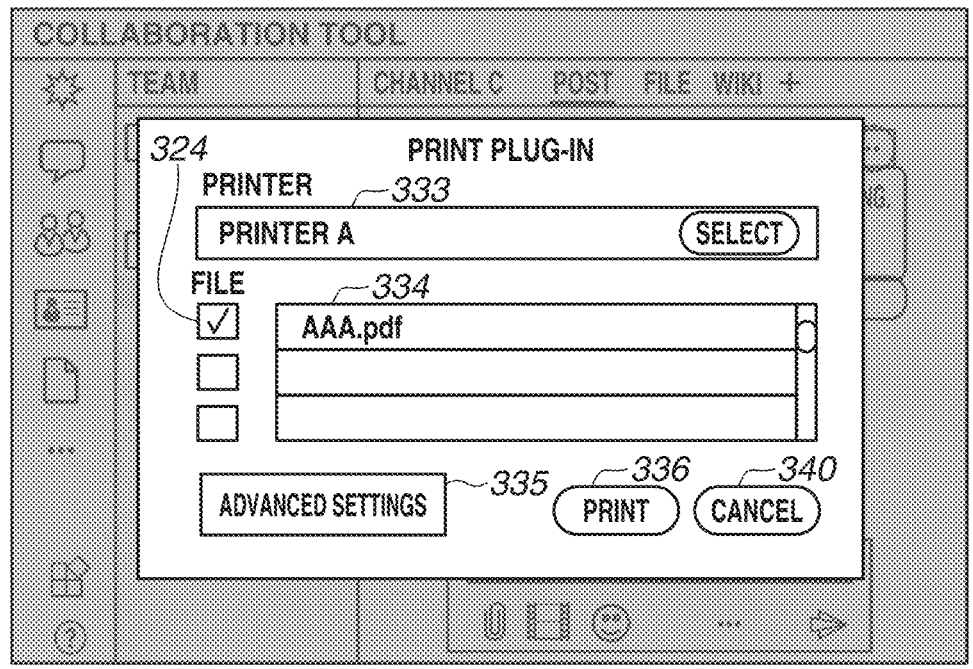

The collaboration tool 300 generates a print setting UI as illustrated in FIG. 5B based on an instruction from the print plug-in service 600 and displays the generated print setting UI on the display unit 115 of the client computer 100. On the print setting UI, there are a printer area 333, a list 334, and a file area 324. The printer area 333 includes a field for displaying a printing destination printer name and a printer selection button. The list 334 is a list of printing target file names. The file area 324 includes, for each file name, a UI for selecting whether to print the corresponding file. Since only one file is attached to the message card 1002 corresponding to the three-dot leader 331, the list 334 displays only "AAA.pdf". In a case where a plurality of files is attached to the message card 1002, the list 334 displays a plurality of file names, and a user selects a file to be printed using the file area 324. A default value of each check in the file area 324 can be either on or off. In a case where a CANCEL button 340 is selected, the print plug-in service 600 causes the collaboration tool 300 to end the display of the print setting UI illustrated in FIG. 5B. Consequently, the display unit 115 of the client computer 100 displays a screen illustrated in FIG. 5A. In FIG. 5B, the print setting UI is displayed in the form of an adaptive card on the screen in FIG. 5A displayed by the collaboration tool 300. In another exemplary embodiment, the print setting UI can be displayed in another form.

An ADVANCED SETTINGS button 335 for calling a web UI for setting the advanced print settings, a button 336 for issuing an instruction to perform printing, and a button 340 for issuing a cancel instruction are displayed. In a case where the ADVANCED SETTINGS button 335 is selected, the print plug-in service 600 causes the collaboration tool 300 to display a print setting screen (not illustrated). On the print setting screen, a setting of the number of copies to print, a color mode setting, and a finishing-related settings such as stapling and punching can be set, and a personal identification number (PIN) code for secure printing can be input. In a case where the button 336 is selected by the user, the print plug-in service 600 transmits a printing target file, the advanced settings, and user information to the printer queue registered in the cloud print service 500 and issues an instruction to perform printing. At this time, the print plug-in service 600 designates the print queue set in the printer area 333 in FIG. 5B and transmits print data to the cloud print service 500.

Figure 5C:
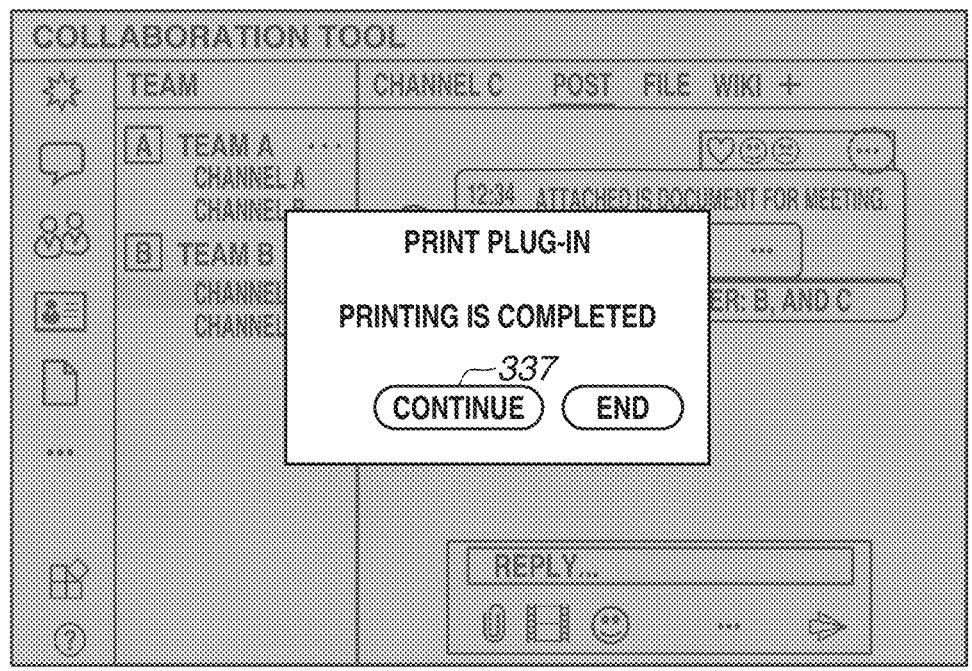

The cloud print service 500 transmits the print data acquired from the print plug-in service 600 to the printer 200 and causes the printer 200 to print the print data. After the printing is completed, the UI on the collaboration tool 300 changes to a printing completed UI illustrated in FIG. 5C. In FIG. 5C, a message indicating that the printing is completed, a button 337 for issuing an instruction to continue the print operation, and a button for issuing an instruction to end the printing are included.

In a case where the button 337 for issuing an instruction to continue the print operation is selected, the print plug-in service 600 re-displays the screen illustrated in FIG. 5B. In a case where the button for issuing an instruction to end the printing is selected, the print plug-in service 600 closes the UI displayed by the print plug-in service 600 and ends the print operation.

Figure 5D:
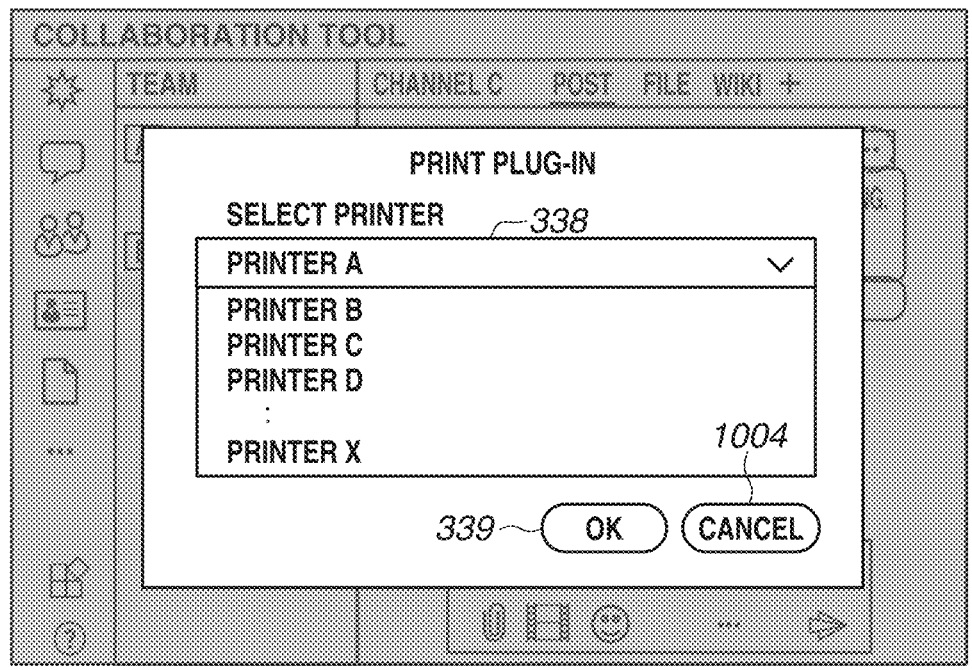

In a case where the printer selection button of the printer area 333 in FIG. 5B is selected, a printer selection UI illustrated in FIG. 5D is displayed. The printer selection UI displays a list of shared printers registered in the cloud print service 500. In a case where an OK button 339 is selected, the print plug-in service 600 displays a screen reflecting the item selected on the printer list UI 338 in the printer name display field of the printer area 333 in FIG. 5B. In a case where a CANCEL button 1004 is selected, the print plug-in service 600 changes the screen to the screen illustrated in FIG. 5B without updating the information.

Next, a procedure from the calling of the print plug-in service 600 to the printing will be described below with reference to FIG. 6.

In step S3001, in a case where the collaboration tool 300 detects the selection of the item "PRINT PLUG-IN" 360 added to the function selection UI 332 from the three-dot leader 331 of the message by a user as illustrated in FIG. 5A, the collaboration tool 300 activates the print plug-in service 600. The collaboration tool 300 notifies the print plug-in service 600 of identification information about the user having issued the instruction to activate the print plug-in service 600, identification information about a team to which the user belongs, and identification information about the attachment file associated with the message card 1002 corresponding to the selected three-dot leader 331.

In step S3002, after the print plug-in service 600 is activated, the print plug-in service 600 transmits a request for a list of registered shared printers to the cloud print service 500. The print plug-in service 600 transmits the identification information about the user and the identification information about the team to which the user belongs, which are received from the collaboration tool 300, and a request to acquire a list of shared printers that the user can use to the cloud print service 500. The list of shared printers is a list of identification information about printers registered in the cloud print service 500 and is a list of identification information about printers that the user corresponding to the identification information transmitted from the print plug-in service 600 is permitted to use.

In step S3003, in a case where the cloud print service 500 approves the request, the print plug-in service 600 receives the list of shared printers from the cloud print service 500.

Then, in step S3004, the print plug-in service 600 combines together the file information and the user information that are received from the collaboration tool 300, the shared printer information, and a default printer, generates the print setting UI as illustrated in FIG. 5B, and displays the generated print setting UI on the collaboration tool 300. In step S3005, the print plug-in service 600 receives the selection of the button 336 in FIG. 5B by the user. The print plug-in service 600 checks operation results (printer information, file information, advanced print settings) on the print setting UI. Then, in step S3006, the print plug-in service 600 transmits a request for printing target file data to the cloud storage 400. Then, in step S3007, the print plug-in service 600 acquires the file specified as a printing target via the screen illustrated in FIG. 5B from the cloud storage 400. In step S3008, the print plug-in service 600 transmits the acquired file data and the advanced print settings to the virtual printer queue of the cloud print service 500. After the cloud print service 500 registers the print data received from the print plug-in service 600, the cloud print service 500 transmits a print data transmission result to the print plug-in service 600. In step S3009, the print plug-in service 600 receives the transmission result from the cloud print service 500. In step S3010, after the cloud print service 500 receives the print data from the print plug-in service 600, the cloud print service 500 transmits the data as a job to the printer 200 and starts printing. In step S3011, after the print plug-in service 600 receives a transmission completion notification, the print plug-in service 600 displays the printing completed UI illustrated in FIG. 5C on the collaboration tool 300.

A procedure before the calling of the print plug-in service 600 by the collaboration tool 300 in the printing procedure illustrated in FIG. 6, and a procedure after the print plug-in service 600 is called from the collaboration tool 300 will be described below with reference to FIGS. 7 and 8.

FIG. 7 is a flowchart illustrating a process performed by the collaboration tool 300. The process illustrated in the flowchart is performed by the CPU 311 of the collaboration tool 300.

In step S4001, the collaboration tool 300 detects the selection of the three-dot leader 331 of the message by the user. In step S4001, the collaboration tool 300 acquires the user identification information about the user having selected the three-dot leader 331 and the identification information about the team to which the user belongs. The collaboration tool 300 determines whether the acquired user identification information is registered in association with the identification information about the print plug-in service 600 in the collaboration tool 300. In a case where the acquired user identification information is registered in association with the identification information about the print plug-in service 600 in the collaboration tool 300, the collaboration tool 300 performs processing of step S4002. In a case where the acquired user identification information is not registered in association with the identification information about the print plug-in service 600 in the collaboration tool 300, the collaboration tool 300 determines whether the acquired identification information about the team is registered in association with the identification information about the print plug-in service 600. In a case where the acquired identification information about the team is registered in association with the identification information about the print plug-in service 600, the collaboration tool 300 performs the processing of step S4002. In a case where the acquired identification information about the team is not registered in association with the identification information about the print plug-in service 600, the collaboration tool 300 determines whether identification information about a chat room corresponding to the three-dot leader 331 is registered in association with the identification information about the print plug-in service 600.

In a case where the identification information about the chat room is registered in association with the identification information about the print plug-in service 600, the collaboration tool 300 performs the processing of step S4002. In a case where the identification information about the chat room is not registered in association with the identification information about the print plug-in service 600, the collaboration tool 300 displays the function selection UI 332 that does not include the "PRINT PLUG-IN" 360. A case where the "PRINT PLUG-IN" 360 is not displayed is not illustrated in FIG. 7.

In step S4002, the collaboration tool 300 displays the function selection UI 332 with the item of the registered print plug-in service 600 added to the standard function of the collaboration tool 300. The standard function of the collaboration tool 300 according to the present exemplary embodiment includes the deleting of a posted message and the downloading of an uploaded file.

In step S4003, the collaboration tool 300 detects the selection of the item of the print plug-in service 600 of the function selection UI 332 by the user. In step S4004, the collaboration tool 300 activates the print plug-in service 600. In step S4005, the collaboration tool 300 acquires file information including a name and a storage location URL of the file attached to the message from which the print plug-in service 600 is called. In step S4006, the collaboration tool 300 acquires user information including a name and an ID of the user by whom the print plug-in service 600 is called. In step S4007, the collaboration tool 300 having acquired information about a location on the collaboration tool 300 and information about the message transmits various types of information including the file information and the user information to the activated print plug-in service 600.

The foregoing process is a process performed by the collaboration tool 300 in activating the print plug-in service 600.

Figure 8:
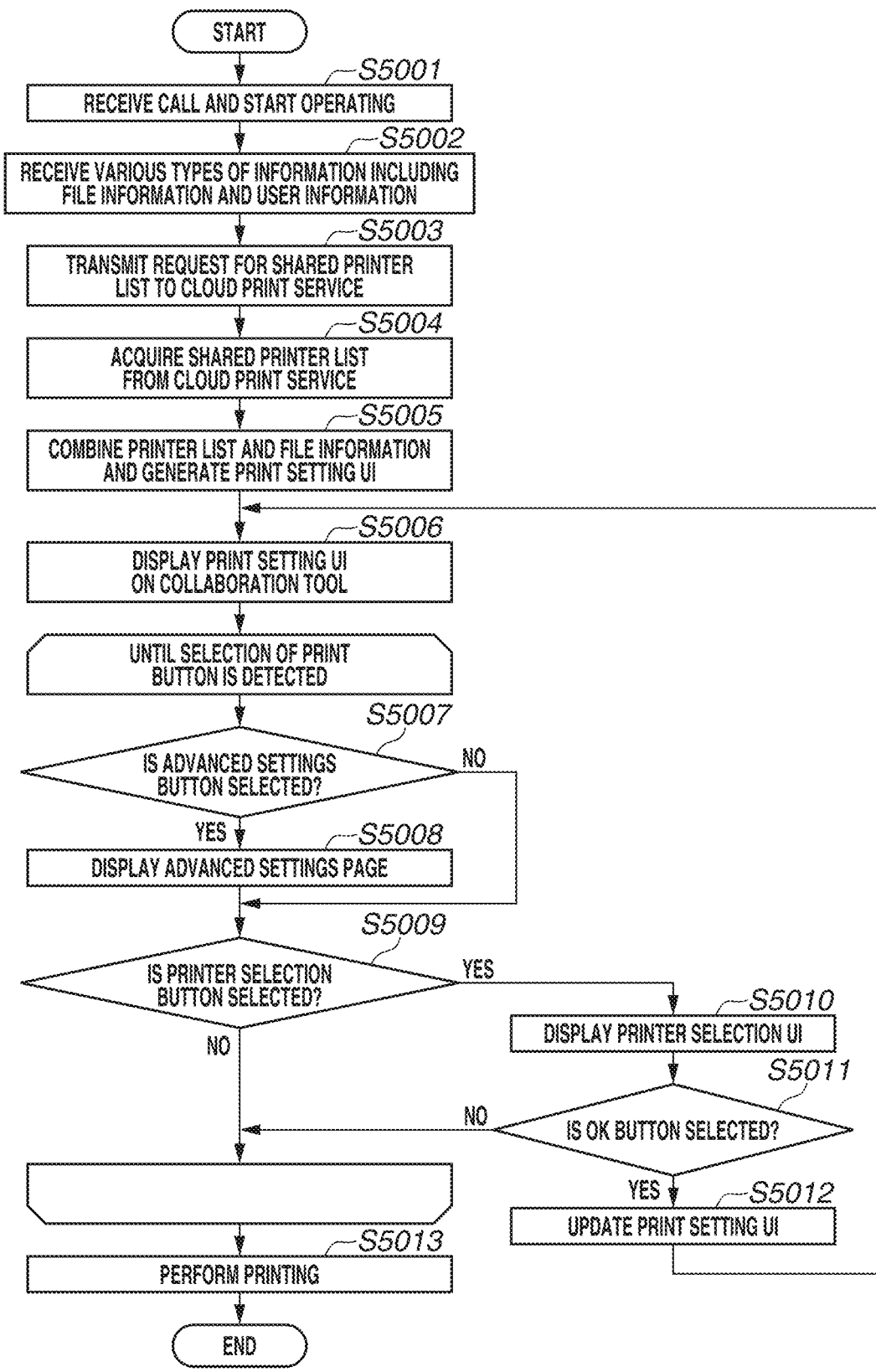
FIG. 8 is a flowchart illustrating a process relating to printing that is performed by a print plug-in according to an exemplary embodiment.

FIG. 8 is a flowchart illustrating a process performed by the print plug-in service 600. In step S5001, the print plug-in service 600 receives a call from the collaboration tool 300 and starts operating. In step S5002, the print plug-in service 600 receives various types of information including the file information and the user information from the collaboration tool 300.

In step S5003, after the receiving of the information from the collaboration tool 300 is completed, the print plug-in service 600 transmits a request for a list of shared printers registered in the cloud print service 500 to the cloud print service 500. Then, in step S5004, the print plug-in service 600 acquires a printer list transmitted from the cloud print service 500.

In step S5005, the print plug-in service 600 combines the file information and generates the print setting UI illustrated in FIG. 5B. Then, in step S5006, the print plug-in service 600 displays the print setting UI on the collaboration tool 300.

User operations are received until the PRINT button 336 is selected. In step S5007, the print plug-in service 600 determines whether the ADVANCED SETTINGS button 335 is selected. In a case where the print plug-in service 600 determines that the ADVANCED SETTINGS button 335 is not selected (NO in step S5007), flow proceeds to step S5009. In a case where the print plug-in service 600 determines that the ADVANCED SETTINGS button 335 is selected (YES in step S5007), flow proceeds to step S5008. In step S5008, the print plug-in service 600 displays the web UI for advanced settings, and the flow then proceeds to step S5009. In step S5009, the print plug-in service 600 determines whether the printer selection button of the printer area 333 is selected. In a case where selection of the printer selection button is detected (YES in step S5009), in step S5010, the print plug-in service 600 displays the printer selection UI illustrated in FIG. 5D.

In step S5011, the print plug-in service 600 determines whether the OK button 339 on the printer selection UI illustrated in FIG. 5D is selected. In a case where the print plug-in service 600 determines that the OK button 339 is selected (YES in step S5011), the processing proceeds to step S5012. In a case where the print plug-in service 600 determines that the CANCEL button 1004 is selected (NO in step S5011), the print plug-in service 600 determines whether the PRINT button 336 is pressed. Then, in step S5013, in a case where the print plug-in service 600 detects selection of the PRINT button 336 in FIG. 5B, the print plug-in service 600 performs print processing In step S5012, in a case where the OK button 339 is selected, the print plug-in service 600 reflects the printer information re-selected by the user on the printer list UI 338 in the print setting UI in FIG. 5B and re-displays the resulting print setting UI on the collaboration tool 300. The flow then returns to step S5006.

As described above, the print plug-in service 600 can be called from the three-dot leader 331 added to the message area posted with the file, and a print instruction can be issued.

Figure 9A:
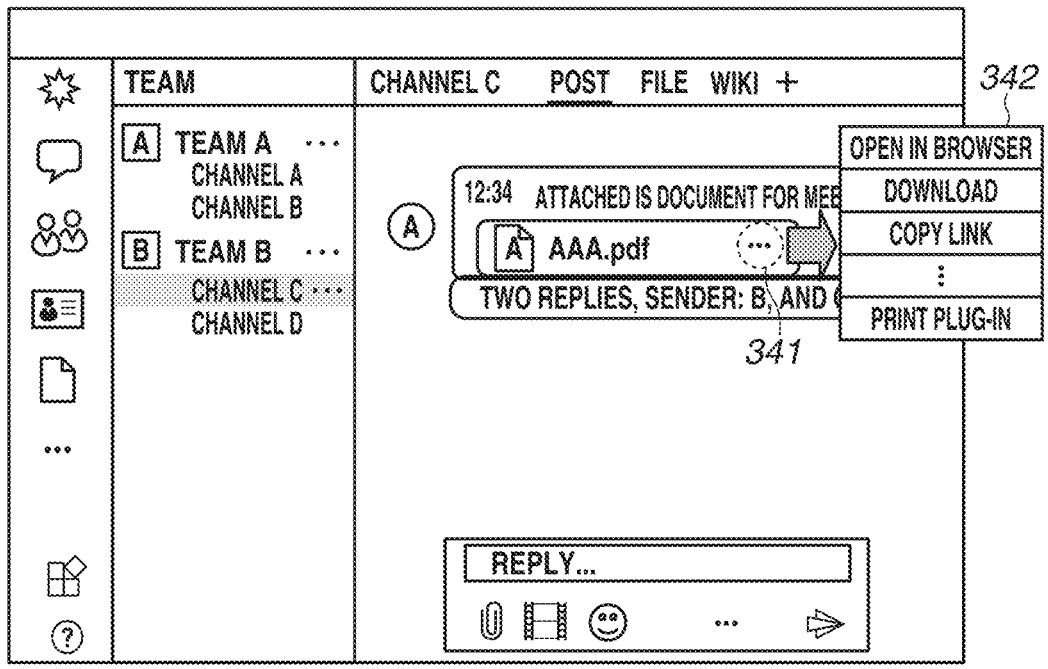
FIGS. 9A and 9B are diagrams illustrating an example of a user interface (UI) for calling a print plug-in according to a second exemplary embodiment.

While the print plug-in service 600 is called from the three-dot leader 331 of the message as illustrated in FIG. 5A in the above-described example according to the first exemplary embodiment, in a second exemplary embodiment, the print plug-in service 600 can be called from a three-dot leader 341 corresponding to a file attached to a message as illustrated in FIG. 9A. The three-dot leader 341 is an object displayed on a one-to-one basis with respect to an uploaded file. The second exemplary embodiment is similar to the above-described first exemplary embodiment with respect to the contents illustrated in FIGS. 1 to 4, 5B to 5D, 6, and 8. As such, their detailed descriptions will be omitted in the following discussion of the second exemplary embodiment.

Turning to FIG. 9A, in a case where a user selects the three-dot leader 341, a function selection UI 342 is displayed. The function selection UI 342 is a UI for selecting a process for a file uploaded to the collaboration tool 300. For example, an "OPEN IN BROWSER" is an option for opening and displaying "AAA.pdf" in a web browser installed in the client computer 100. A "DOWNLOAD" is an option for downloading "AAA.pdf" to the client computer 100. A "COPY LINK" is an option for copying a link for acquiring "AAA.pdf" from the cloud storage 400. As described above, the three-dot leader 341 added to the uploaded file is an object for selecting a process for the uploaded file instead of a process for the entire posted message.

In a case where the function selection UI 342 is displayed and a "PRINT PLUG-IN" is selected in FIG. 9A, the screen illustrated in FIG. 5B is displayed. On the displayed screen, the file "AAA.pdf" corresponding to the three-dot leader 341 is displayed as a printing target file. Screens displayed by the print plug-in service 600 and processes thereafter are similar to those in the first exemplary embodiment, as such, their descriptions are omitted.

Figure 9B:
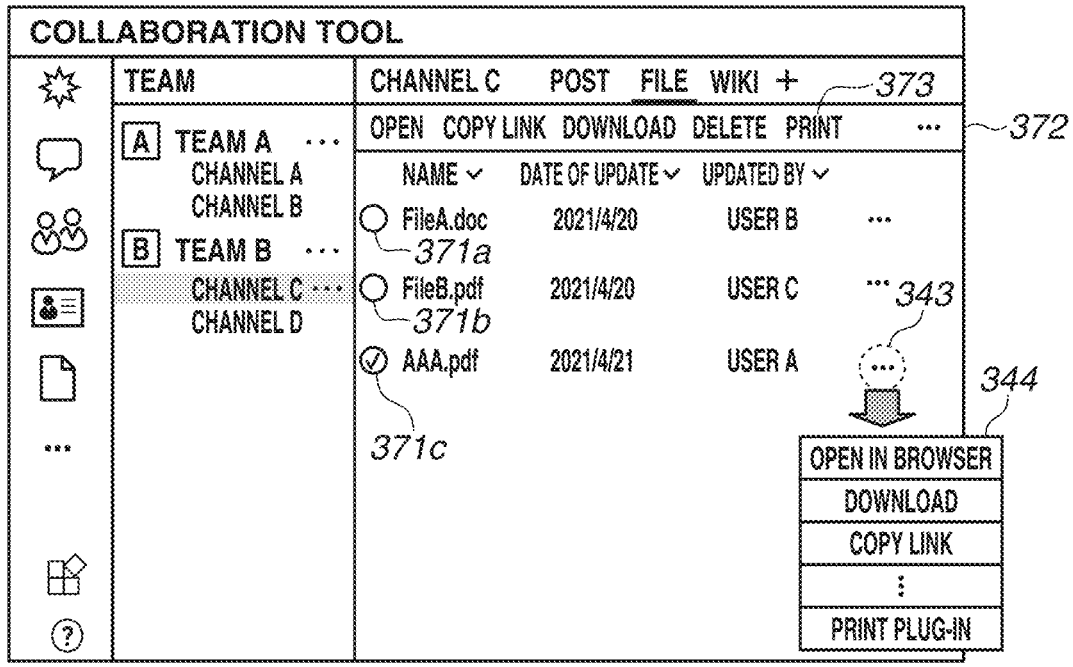

As illustrated in FIG. 9B, a UI that displays a list of files shared in a tenant of the collaboration tool for each tenant or channel and a UI that displays a list of files in the cloud storage 400 in collaboration with the cloud storage 400 are prepared. A three-dot leader can be provided for each file also on the UI that displays the list of files, and the print plug-in service 600 can be called from the three-dot leader. FIG. 9B illustrates a list of files shared by users belonging to a channel C of a team B. In FIG. 9B, "NAME" indicates names of the files, and "DATE OF UPDATE" indicates information about dates of update of the files. "UPDATED BY" indicates usernames of last updaters of the files.

In a case where a "PRINT PLUG-IN" is selected from a function selection UI 344 in FIG. 9B, the screen illustrated in FIG. 5B is displayed. At this time, the file "AAA.pdf" corresponding to a three-dot leader 343 used to call the print plug-in service 600 is selected as a printing target file on the displayed screen.

The three-dot leader 343 is a three-dot leader that corresponds to "AAA.pdf". In the list of files in FIG. 9B, a three-dot leader is added to every file on a one-to-one basis. A user can open a file in a browser, download the file, and/or print the file by calling the function selection UI 344 from the three-dot leader added to each file.

An example where printing is performed by the print plug-in service 600 being called from the three-dot leader of a file displayed on the collaboration tool 300 as illustrated in FIG. 9A or FIG. 9B according to the second exemplary embodiment will be described below.

Figure 10:
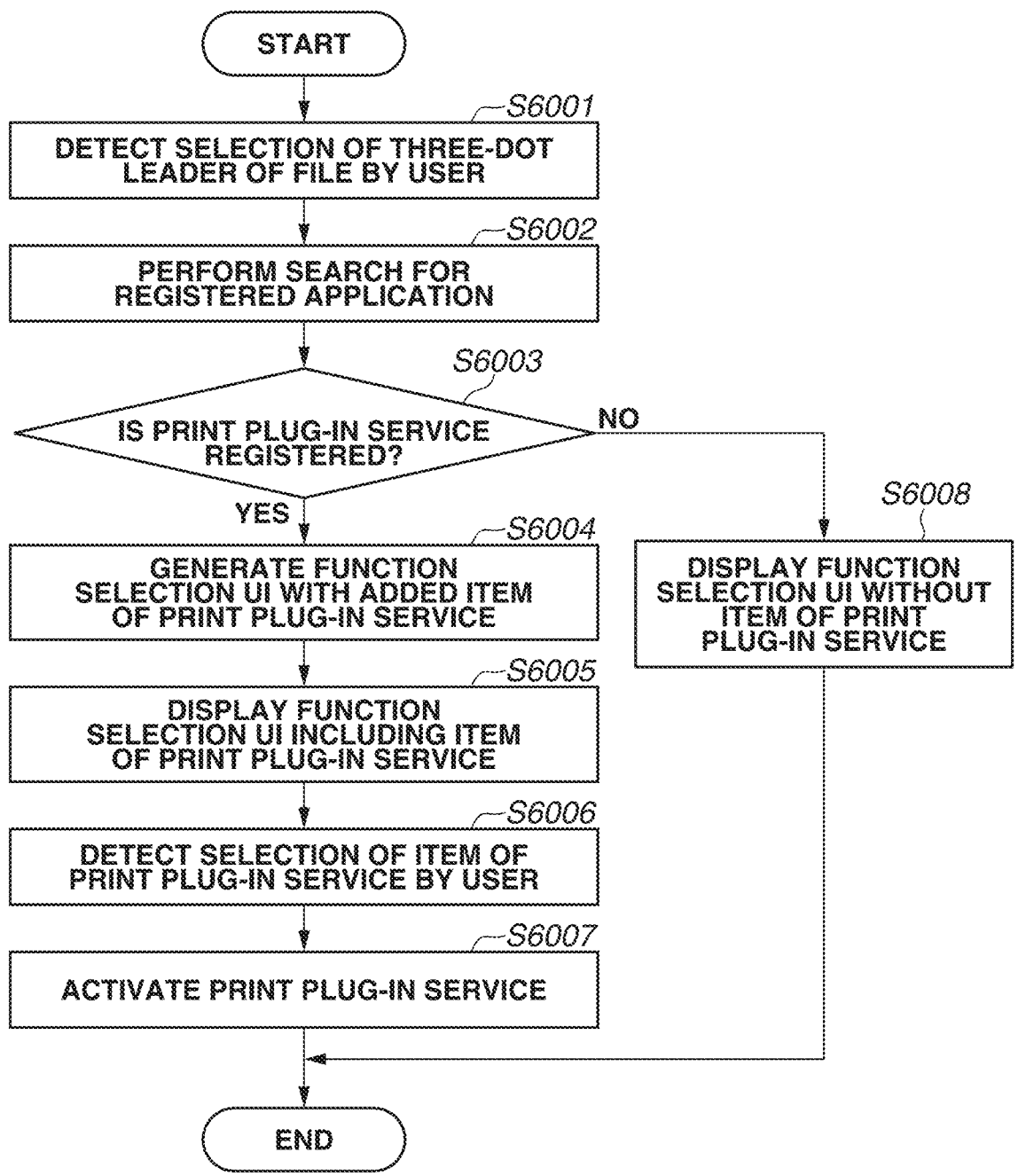
FIG. 10 is a flowchart illustrating a process of activating a print plug-in from a function selection UI including an item of the print plug-in according to the second exemplary embodiment.

FIG. 10 is a diagram illustrating a procedure of calling the print plug-in service 600 from the three-dot leader of a file on the collaboration tool 300 in FIG. 9A or FIG. 9B.

FIG. 10 is a flowchart illustrating a process performed by the CPU 311 of the collaboration tool 300.

In step S6001, the collaboration tool 300 detects the selection of the three-dot leader 341 or 343 in FIG. 9A or FIG. 9B by a user. In step S6002, the collaboration tool 300 performs a search for registered applications or services. In step S6003, the collaboration tool 300 determines whether applications obtained as a search result include the print plug-in service 600. The collaboration tool 300 determines whether the print plug-in service 600 is registered using identification information about the user having selected the three-dot leader 341 or 343, identification information about a team to which the user belongs, and identification information about a chat room where the three-dot leader 341 or 343 is displayed. In a case where any one of the user identification information, the team identification information, and the chat room identification information is registered in association with the identification information about the print plug-in service 600 in the collaboration tool 300, the collaboration tool 300 determines that the print plug-in service 600 is registered.

In a case where the print plug-in service 600 is not included (NO in step S6003), then, in step S6008, the collaboration tool 300 displays a function selection UI that does not include the "PRINT PLUG-IN" as an option.

In a case where the print plug-in service 600 is included (YES in step S6003), in step S6004, the collaboration tool 300 generates the function selection UI 342 or 344 with an added item of the print plug-in service 600. In step S6005, the collaboration tool 300 displays the generated function selection UI 342 or 344 on the collaboration tool 300. Then, in step S6006, the collaboration tool 300 detects the selection of the item of the print plug-in service 600 on the function selection UI 342 or 344 by the user. In step S6007, the collaboration tool 300 activates the print plug-in service 600. In step S6007, the collaboration tool 300 notifies the print plug-in service 600 of the identification information about the user having selected the print plug-in service 600, the information about the team to which the user belongs, and identification information about the file associated with the three-dot leader 341 or 343 used in activating the print plug-in service 600.

The printing procedure and operations of the print plug-in service 600 thereafter are similar to those in the first exemplary embodiment, as such, detailed descriptions thereof are omitted.

A plurality of files can be printed simultaneously in a case where the print plug-in service 600 is activated from the screen of the list of files illustrated in FIG. 9B. For example, the files to be printed are selected from checkboxes 371a, 371b, and 371c displayed next to the file names in FIG. 9B. In a case where at least one of the checkboxes 371a to 371c is selected, a "PRINT" 373 is displayed in an area 372. In a case where the "PRINT" 373 is selected by the user, the collaboration tool 300 activates the print plug-in service 600 and notifies the print plug-in service 600 of a file name and a file path of each selected file corresponding to one of the checkboxes 371a to 371c. Consequently, the print plug-in service 600 displays the screen illustrated in FIG. 5B. At this time, the file name(s) of the file(s) selected by the user from among the checkboxes 371a to 371c is displayed in the list 334 in FIG. 5B. In FIG. 5B, all checkboxes next to the file names can be in a selected state, or the checkboxes can be in a state where none of the files are selected.

As described above, in a case where a file is selected on FIG. 9B, the "PRINT" 373 is displayed in the area 372. In another exemplary embodiment, the "PRINT" 373 can be displayed constantly in the area 372 in a case where the print plug-in service 600 is associated with the team sharing the file.

By performing the foregoing operations, printing is performed as a process for the file selected by the collaboration tool 300.

Figure 11A:
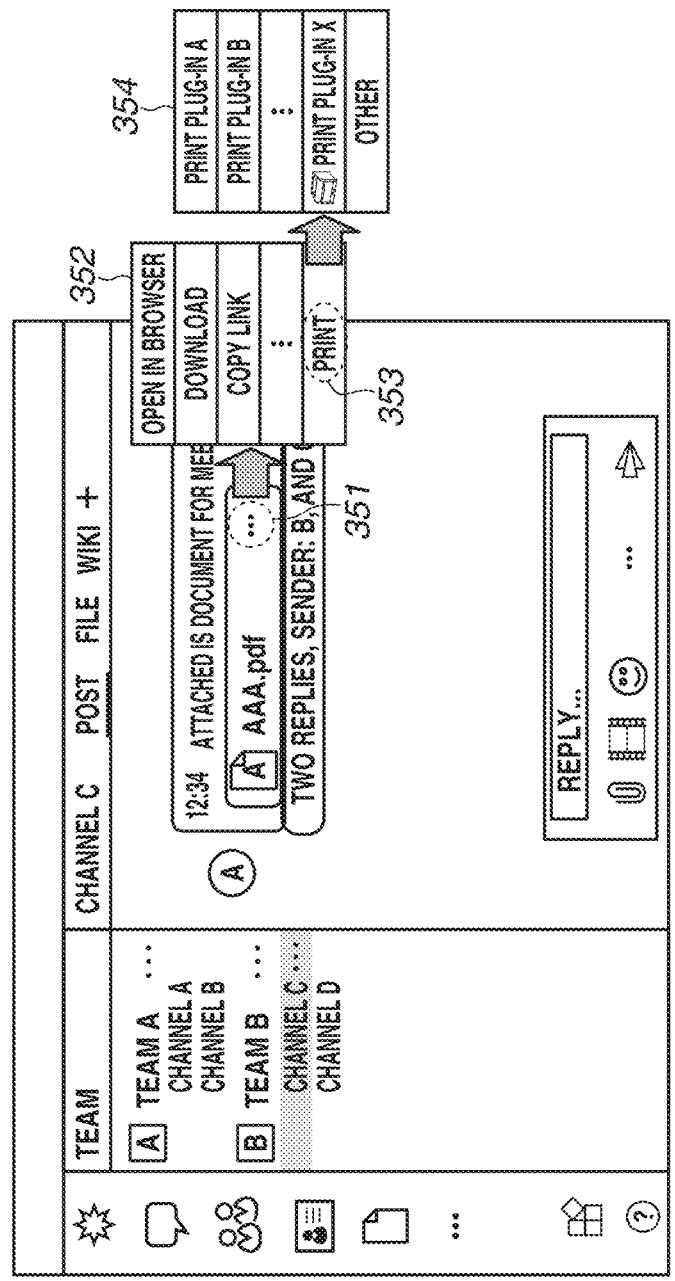
FIGS. 11A and 11B are diagrams illustrating an example of a UI for calling a print plug-in according to a third exemplary embodiment.
Figure 11B:
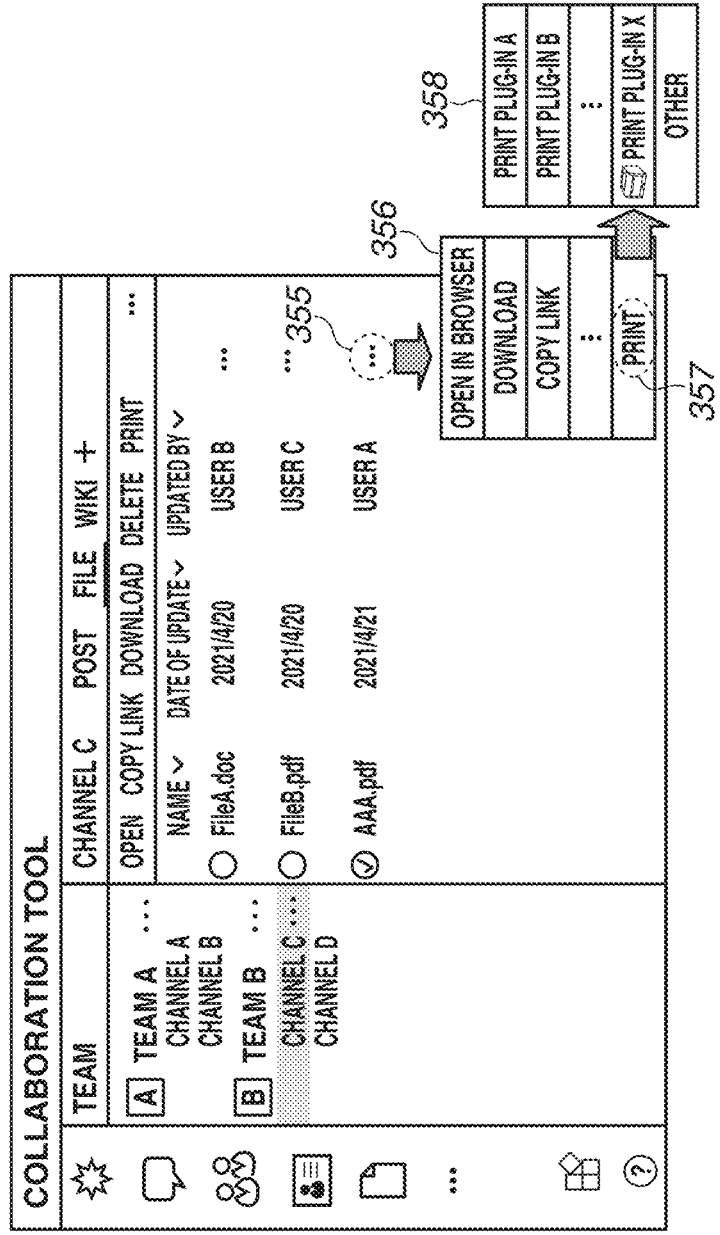

According to the above-described first and second exemplary embodiments, the item of the print plug-in service 600 is added to the function selection UIs directly below the three-dot leaders. In a third exemplary embodiment, a function selection UI called from a three-dot leader added to a file includes a print item as illustrated in FIGS. 11A and 11B. In a case where the print item is selected, the collaboration tool 300 displays a print function selection UI including a list of printing-related plug-ins as a second hierarchical layer. The third exemplary embodiment is similar to the above-described first exemplary embodiment with respect to contents illustrated in FIGS. 1 to 4, 5B to 5D, 6, and 8. As such, their detailed descriptions will be omitted in the following discussion of the third exemplary embodiment FIGS. 11A and 11B illustrate an example of a screen displayed by the collaboration tool 300 according to the third exemplary embodiment. In FIG. 11A, in a case where a user selects a three-dot leader 351 next to a file name of a file to be printed, a function selection UI 352 is displayed, and a "PRINT" 353 is displayed on the function selection UI 352. In a case where the user selects the "PRINT" 353, a print plug-in selection UI 354 is displayed.

The area displays a list of installed applications that provide the print function to a user, a team to which the user belongs, or the chat room associated with the three-dot leader 351 on the collaboration tool 300. In the area, a plurality of print plug-ins providing different functions from each other is displayed.

Figure 12A:
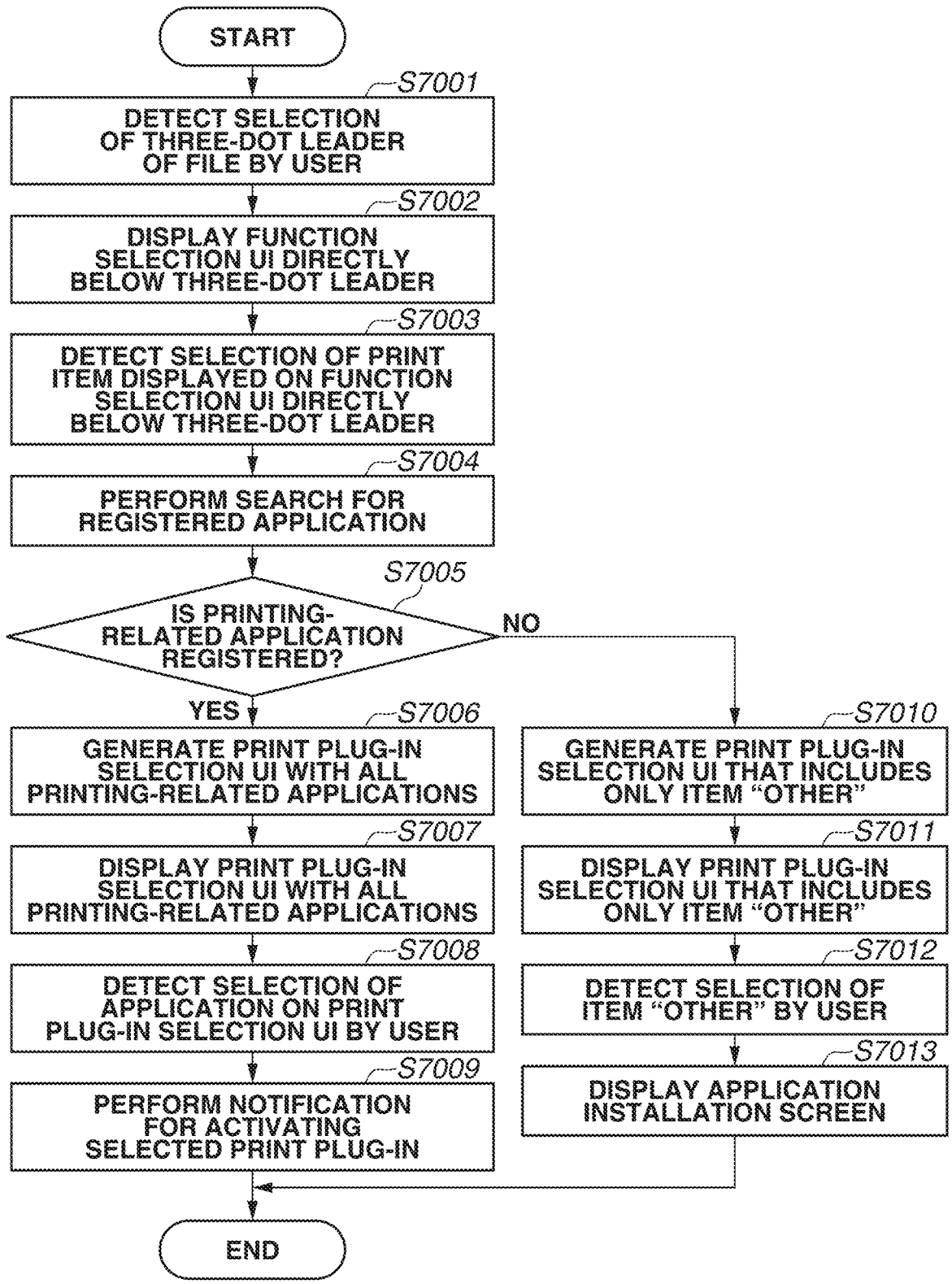
FIGS. 12A and 12B are flowcharts illustrating a process of activating a print plug-in from a function selection UI including a print item according to the third exemplary embodiment.

FIG. 12A illustrates a procedure of calling the print plug-in service 600 from the print function selection UI of the second hierarchical layer. FIG. 12A is a flowchart illustrating a process performed by the CPU 311 of the collaboration tool 300.

First, in step S7001, the collaboration tool 300 detects the selection of the three-dot leader 351 or 355 of the file by the user. In step S7002, the collaboration tool 300 displays the function selection UI 352 or 356, which is a first hierarchical layer. Which one of the function selection UIs 352 and 356 is displayed depends on whether a screen associated with the selected three-dot leader is a chat screen or a file list screen. The function selection UIs 352 and 356 respectively include print items 353 and 357.

In step S7003, the collaboration tool 300 detects the selection of the print item 353 or 357. In step S7004, the collaboration tool 300 performs a search for all registered applications or services. The collaboration tool 300 searches for a print plug-in associated with one of identification information about the user having selected the "PRINT", identification information about a team to which the user belongs, and identification information about a chat room used in calling the function selection UI.

In step S7005, the collaboration tool 300 determines whether applications obtained as a search result include a printing-related application. A manifest file of an application provided for extending a function of a collaboration tool can describe a category of the application. In step S7005, the collaboration tool 300 refers to a manifest file of each of the registered applications or services and searches for an application with a description "print" as the category.

In a case where the collaboration tool 300 determines that a printing-related application is registered (YES in step S7005), in step S7006, the collaboration tool 300 generates the print plug-in selection UI 354 of the second hierarchical layer. In step S7006, the collaboration tool 300 generates the print plug-in selection UI 354 or 358 displaying the applications with the description "print" as the category and an item "OTHER".

Then, in step S7007, the collaboration tool 300 displays the generated print plug-in selection UI 354 or 358 on the client computer 100.

Then, in step S7008, the collaboration tool 300 detects the selection of an item of an application included in the print plug-in selection UI 354 or 358. In step S7009, the collaboration tool 300 performs notification for activating the selected print plug-in.

In a case where the collaboration tool 300 determines that the applications obtained as the search result do not include printing-related applications (NO in step S7005), in step S7010, the collaboration tool 300 generates a print plug-in selection UI that includes only the item "OTHER". In step S7011, the collaboration tool 300 displays the generated print plug-in selection UI on the display unit 115 of the client computer 100. Then, in step S7012, the collaboration tool 300 detects the selection of the item "OTHER" by the user, and in step S7013, the collaboration tool 300 changes the screen to the installable application list screen illustrated in FIG. 3B and prompts the user to install an application.

In the above-described exemplary embodiment, in a case where the item "OTHER" is selected in step S7008, the collaboration tool 300 displays, on a screen for selecting an application to be installed, an application that is not installed and includes a printing-related function. This corresponds to the processing of step S7013.

In FIG. 12A, the function selection UI 352 or 356 including the print item 353 or 357 is generated regardless of whether there is a printing-related application. The item "PRINT" on the function selection UI 352 or 356 can be hidden in a case where no print plug-ins are added by the user. Specifically, as in the procedure in FIG. 12B, whether to include the print item in generating the function selection UI can be determined based on whether there is a printing-related application, and a function selection UI that does not include a print item can be displayed.

Figure 12B:
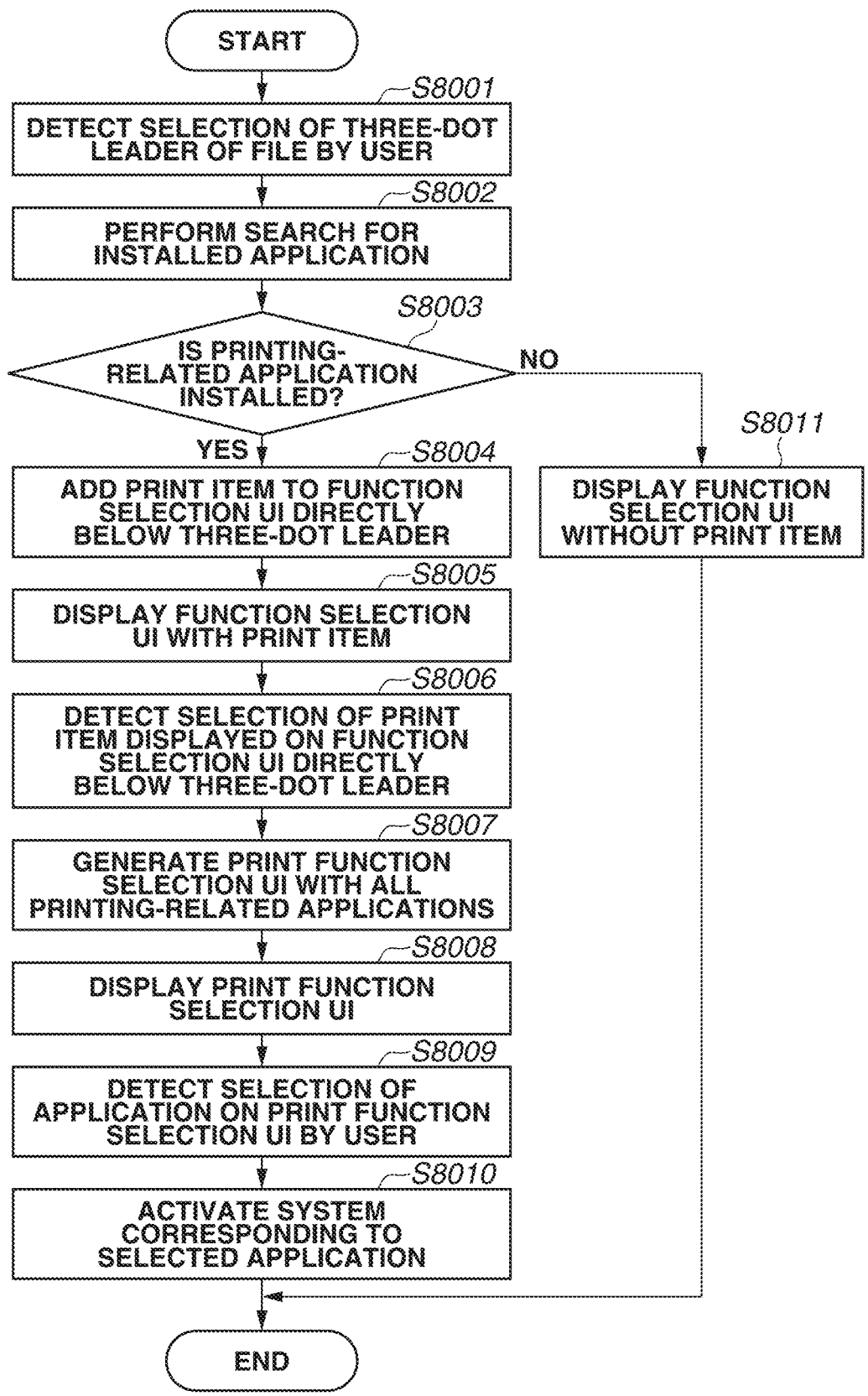

Turning to FIG. 12B, in step S8001, the collaboration tool 300 detects the selection of a three-dot leader of a file by a user. In step S8002, the collaboration tool 300 performs a search for installed applications. In step S8003, the collaboration tool 300 determines whether a search result includes a printing-related application. In a case where the search result does not include printing-related applications (NO in step S8003), in step S8011, the collaboration tool 300 displays a function selection UI that does not include the print item. In a case where the collaboration tool 300 confirms that at least one printing-related application is included (YES in step S8003), in step S8004, the collaboration tool 300 generates the function selection UI 352 or 356 including the print item 353 or 357 as illustrated in FIG. 11A or 11B. In step S8005, the collaboration tool 300 displays the generated function selection UI 352 or 356. Then, in step S8006, the collaboration tool 300 detects the selection of the print item 353 or 357 by the user, and in step S8007, the collaboration tool 300 generates a print function selection UI including all the printing-related applications detected in step S8003. In step S8008, the collaboration tool 300 displays the generated print function selection UI.

In step S8009, the collaboration tool 300 detects the selection of an item of an application on the print function selection UI by the user, and in step S8010, the collaboration tool 300 activates the corresponding system.

The printing procedure and operations of the print plug-in service 600 thereafter are similar to those in the first and the second exemplary embodiments, and as such, descriptions thereof are omitted.

In FIGS. 12A and 12B, a screen for selecting an application to be installed from among applications that are not installed and include the print function is displayed in a case where the item "OTHER" is selected on the print plug-in selection UI 354 or 358 by the user. Alternatively, the collaboration tool 300 can perform the following operations in the case where the item "OTHER" is selected.

Specifically, the collaboration tool 300 generates a portable document format (PDF) file based on the file corresponding to the selected three-dot leader. The collaboration tool 300 activates a PDF viewer installed in the client computer 100 or an application capable of displaying PDF files and displays the generated PDF file. The foregoing operations enable the user to print the file without installing an application including the print function in the collaboration tool 300.

Thus, the user can freely select a plug-in to use even in a case where a plurality of print plug-ins is registered.

The processes illustrated in FIGS. 7, 10, 12A, and 12B are described above as processes that are performed by the collaboration tool 300 serving as a server system according to the first to third exemplary embodiments. In another exemplary embodiment, the above-described processes can be performed by an application for the collaboration tool 300 installed in the client computer 100.

The present disclosure can also be realized by a software (program) for implementing the functions according to the above-described exemplary embodiments being supplied to a system or an apparatus via a network or various storage media, and a computer (or a CPU or a micro-processing unit (MPU)) of the system or the apparatus reading program codes and executing the read program codes. In this case, the computer program and the storage medium that stores the computer program are also encompassed within the scope of the present disclosure.

Implementing the present disclosure enables a user to select a file to print by operating an information processing apparatus in which a collaboration tool is installed.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-176243, filed Oct. 28, 2021, which is hereby incorporated by reference herein in its entirety.

What is claimed is:

1. A server system configured to operate in collaboration with software providing a chat function that displays, in a case where a plurality of files are posted with a message, a message object including a plurality of file names of the plurality of files and the message, and displays a first object to be selected for performing an operation relating to the message, the server system comprising:
   a memory storing a program; and
   a control unit, the control unit configured to execute the program to:
   display, based on selection of the first object for performing the operation relating to the message, a plurality of objects corresponding to a plurality of functions including a print function;
   display, based on selection of an object corresponding to the print function, a second object corresponding to a print plug-in and a third object corresponding to another print plug-in, in a case where the print plug-in and the another print plug-in are installed when the object corresponding to the print function is selected;
   display a screen for receiving an instruction for installing a print plug-in, in a case where any print plug-ins are not installed when the object corresponding to the print function is selected;
   display, based on the instruction for installing the print plug-in, an input area for inputting a channel name of a channel with which the print plug-in to be installed is to be associated, the channel being a channel of the chat function;
   install the print plug-in in association with the channel having the input channel name;
   receive identification information about a user who has selected the second object;
   cause, based on selection of the second object, the software to display a candidate of a file to be printed, the candidate including the plurality of files and identification information about a printer registered in association with the user; and
   cause a printer, about which the displayed identification information is selected, to perform the print function for a file selected from the displayed candidate.

2. The server system according to claim 1, wherein the control unit is further configured to cause, based on the selection of the second object, the software to display a screen for making a setting relating to the print function.

3. The server system according to claim 1, wherein the control unit is further configured to acquire, based on the selection of the second object, a plurality of pieces of information about the plurality of files from the software.

4. The server system according to claim 3, wherein the plurality of pieces of information are file paths of the plurality of files.

5. The server system according to claim 4,
   wherein the control unit is further configured to cause the software to display a print setting screen,
   wherein the control unit is further configured to cause the server system to acquire the selected file based on a file path of the selected file, and
   wherein the control unit is further configured to cause the server system to transmit the acquired file and a print setting made via the displayed print setting screen to another server system.

6. An information processing apparatus where software providing a chat function is installed, the information processing apparatus comprising:
   a memory storing a program; and
   a control unit, the control unit configured to execute the program to:
   cause a display unit to display, in a case where a plurality of files are posted with a message, a message object including a plurality of file names of the plurality of files and the message, display a first object to be selected for performing an operation relating to the message, and display, based on selection of the first object for performing the operation relating to the message, a plurality of objects corresponding to a plurality of functions including a print function, and display, based on selection of an object corresponding to the print function, a second object corresponding to a print plug-in and a third object corresponding to another print plug-in, in a case where the print plug-in and the another print plug-in are installed when the object corresponding to the print function is selected;
   cause the display unit to display a screen for receiving an instruction for installing a print plug-in, in a case where any print plug-ins are not installed when the object corresponding to the print function is selected;
   cause the display unit to display, based on the instruction for installing the print plug-in, an input area for inputting a channel name of a channel with which the print plug-in to be installed is to be associated, the channel being a channel of the chat function,
   wherein the print plug-in is installed in association with the channel having the input channel name;
   receive identification information about a user who has selected the second object,
   wherein the display unit displays, based on selection of the second object, a candidate of a file to be printed, the candidate including the plurality of files and identification information about a printer registered in association with the user; and cause a printer, about which the displayed identification information is selected, to perform the print function for a file selected from the displayed candidate.

7. The information processing apparatus according to claim 6, the control unit is further configured to acquire, based on the selection of the second object, a plurality of pieces of information about the plurality of files.

8. The information processing apparatus according to claim 7, wherein the plurality of pieces of information are file paths of the plurality of files.

9. The information processing apparatus according to claim 8,
wherein the control unit is further configured to execute the program to:
cause the display unit to display a print setting screen, acquire the selected file based on a file path of selected file, and
transmit the acquired file and a print setting made via the displayed print setting screen to a server system.

10. A method for controlling an information processing apparatus in which software providing a chat function is installed, the method comprising:
displaying, in a case where a plurality of files are posted with a message, a message object including a plurality of file names of the plurality of files and the message;
displaying a first object to be selected for performing an operation relating to the message;
displaying, based on selection of the first object for performing the operation relating to the message, a plurality of objects corresponding to a plurality of functions including a print function;
displaying, based on selection of an object corresponding to the print function, a second object corresponding to a print plug-in and a third object corresponding to another print plug-in, in a case where the print plug-in and the another print plug-in are installed when the object corresponding to the print function is selected;
displaying a screen for receiving an instruction for installing a print plug-in, in a case where any print plug-ins are not installed when the object corresponding to the print function is selected;
displaying, based on the instruction for installing the print plug-in, an input area for inputting a channel name of a channel with which the print plug-in to be installed is to be associated, the channel being a channel of the chat function;
installing the print plug-in in association with the channel having the input channel name;
receiving identification information about a user who has selected the second object;
displaying, based on selection of the second object, a candidate of a file to be printed, the candidate including the plurality of files and identification information about a printer registered in association with the user; and
causing a printer, about which the displayed identification information is selected, to perform the print function for a file selected from the displayed candidate.

* * * * *